US008112718B2

(12) United States Patent
Nezu et al.

(10) Patent No.: US 8,112,718 B2
(45) Date of Patent: Feb. 7, 2012

(54) PLAYBACK APPARATUS, MENU DISPLAY METHOD, AND RECORDING MEDIUM RECORDING PROGRAM IMPLEMENTING MENU DISPLAY METHOD

(75) Inventors: Yoshiyuki Nezu, Tokyo (JP); Satoshi Yamazaki, Chiba (JP)

(73) Assignee: Sony Corporation, Tokyo (JP)

( * ) Notice: Subject to any disclaimer, the term of this patent is extended or adjusted under 35 U.S.C. 154(b) by 243 days.

(21) Appl. No.: 11/492,126

(22) Filed: Jul. 25, 2006

(65) Prior Publication Data
US 2007/0028269 A1 Feb. 1, 2007

(30) Foreign Application Priority Data
Jul. 27, 2005 (JP) ................................. 2005-217290

(51) Int. Cl.
*G06F 3/048* (2006.01)
(52) U.S. Cl. ........ 715/810; 715/716; 715/727; 715/817; 715/818; 715/819; 715/820; 715/822
(58) Field of Classification Search .................. 715/820, 715/822, 716, 727, 810, 817, 818, 819
See application file for complete search history.

(56) References Cited

U.S. PATENT DOCUMENTS

| 6,880,132 B2* | 4/2005 | Uemura ........................ 715/848 |
| 6,983,426 B1 | 1/2006 | Kobayashi et al. | |
| 7,600,192 B1* | 10/2009 | Hashimoto et al. ........... 715/802 |
| 7,676,763 B2* | 3/2010 | Rummel ........................ 715/841 |
| 7,689,931 B2* | 3/2010 | Koga et al. ..................... 715/812 |
| 7,707,503 B2* | 4/2010 | Good et al. .................... 715/732 |
| 2002/0069412 A1 | 6/2002 | Philips | |
| 2002/0093884 A1 | 7/2002 | Hochendoner | |
| 2003/0112467 A1* | 6/2003 | McCollum et al. .......... 358/1.18 |
| 2003/0163211 A1* | 8/2003 | Van Der Meulen ............. 700/94 |
| 2004/0055446 A1* | 3/2004 | Robbin et al. ................... 84/615 |
| 2004/0189827 A1* | 9/2004 | Kim et al. .................. 348/231.4 |

(Continued)

FOREIGN PATENT DOCUMENTS
EP       1 548 740 A2    6/2005
(Continued)

OTHER PUBLICATIONS

Tracy Marks, "Windows Manual", URL:http://Web.archive.org/web/20050205013838/http://www.Windweaver.com/w95man2g.htm, XP-007901353, Feb. 5, 2005, pp. 1-4.

(Continued)

*Primary Examiner* — Tadesse Hailu
*Assistant Examiner* — Patrick Riegler
(74) *Attorney, Agent, or Firm* — Oblon, Spivak, McClelland, Maier & Neustadt, L.L.P.

(57) ABSTRACT

A playback apparatus includes a menu screen display unit for displaying a content menu screen, an input unit for detecting a user's input operation to detect a selection of the content, and a control unit for causing the menu screen display unit to switch the menu screen, and for instructing playback of the selected content. The menu screen display unit, under the control of the control unit, switches an upper layer menu screen to and from a lower layer menu screen through an intermediate layer menu screen. The upper layer menu screen shows categories of the contents using menus. The lower layer menu screen shows some of contents using menus. The intermediate layer menu screen displays the menu selected in the upper layer menu screen in an area and a plurality of menus displayed in the lower layer menu screen in another area.

7 Claims, 17 Drawing Sheets

U.S. PATENT DOCUMENTS

| | | |
|---|---|---|
| 2004/0236568 A1 | 11/2004 | Guillen et al. |
| 2004/0252119 A1* | 12/2004 | Hunleth et al. ............... 345/440 |
| 2004/0252120 A1* | 12/2004 | Hunleth et al. ............... 345/440 |
| 2004/0268393 A1* | 12/2004 | Hunleth et al. ................ 725/44 |
| 2005/0005241 A1* | 1/2005 | Hunleth et al. ............... 715/720 |
| 2005/0096812 A1* | 5/2005 | Nezu et al. ..................... 701/36 |
| 2005/0125826 A1* | 6/2005 | Hunleth et al. ................ 725/45 |
| 2005/0251760 A1* | 11/2005 | Sato et al. ..................... 715/856 |
| 2005/0283804 A1* | 12/2005 | Sakata et al. ................... 725/52 |
| 2006/0025920 A1* | 2/2006 | Nezu et al. .................... 701/200 |
| 2006/0053472 A1* | 3/2006 | Goto et al. .................... 725/141 |
| 2006/0271867 A1* | 11/2006 | Wang et al. ................... 715/764 |
| 2007/0220580 A1* | 9/2007 | Putterman et al. ............ 725/134 |

FOREIGN PATENT DOCUMENTS

| | | |
|---|---|---|
| JP | 7-93120 | 4/1995 |
| JP | 10-97366 | 4/1998 |
| JP | 11-296547 | 10/1999 |
| JP | 2001-125913 | 5/2001 |
| JP | 2002-82745 | 3/2002 |
| JP | 2002-82746 | 3/2002 |
| JP | 2002-116857 | 4/2002 |
| JP | 2004-30469 | 1/2004 |
| JP | 2004-38896 | 2/2004 |
| JP | 2004-62649 | 2/2004 |
| JP | 2004-118601 | 4/2004 |
| JP | 2005-98831 | 4/2005 |
| JP | 2005-115634 | 4/2005 |

OTHER PUBLICATIONS

Digital E: "Nomad Jukebox Getting Started Version 1.0", [Online] URL:htp://www.minidisc.org/manuals/nomad/Nomad_Jukebox.pdf>, XP-002276160, Aug. 2000, (whole document).

U.S. Appl. No. 12/332,488, filed Dec. 11, 2008, Nezu.

Office Action issued Feb. 22, 2011, in Japan Patent Application No. 2005-217290.

* cited by examiner

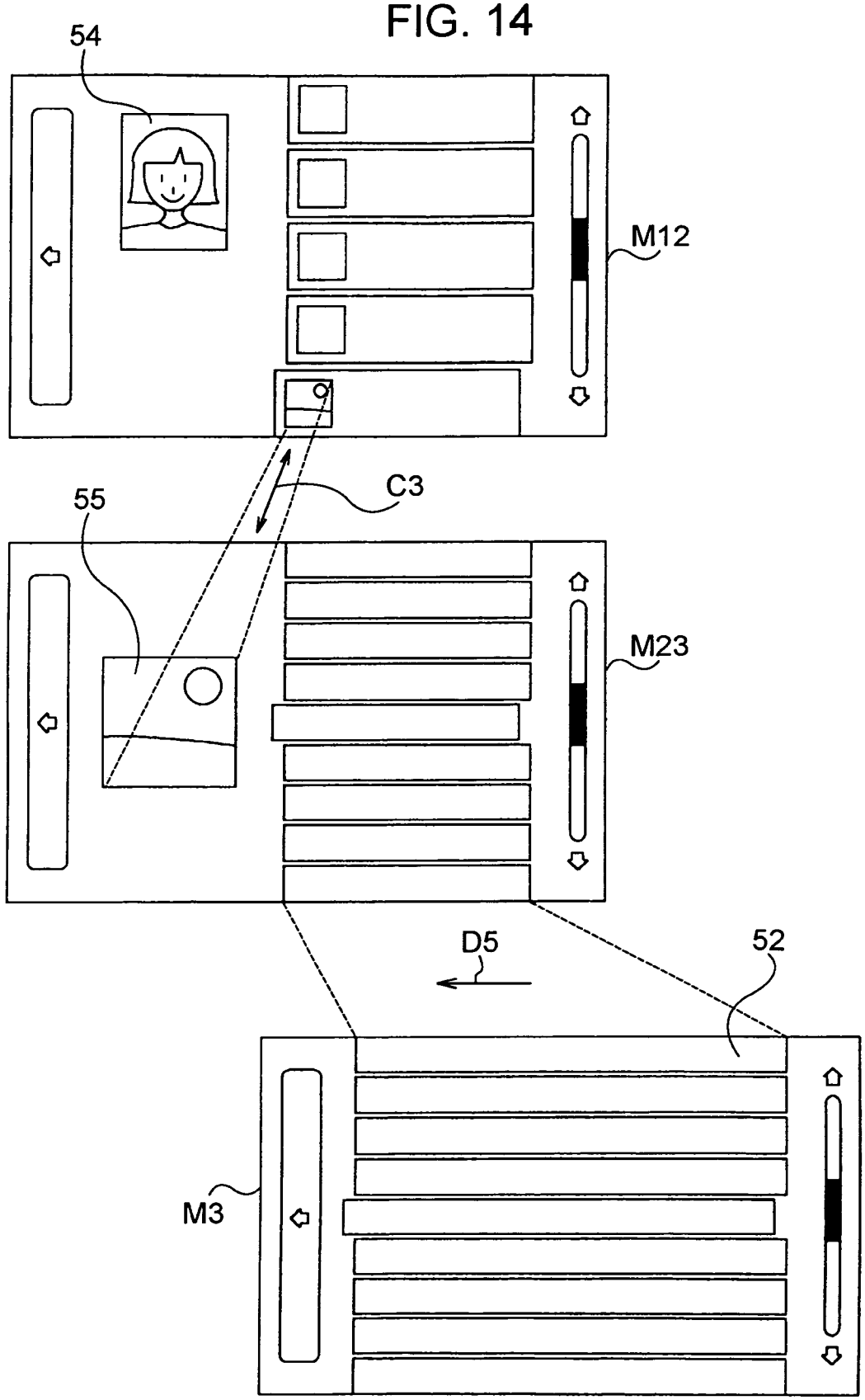

PLAYBACK APPARATUS, MENU DISPLAY METHOD, AND RECORDING MEDIUM RECORDING PROGRAM IMPLEMENTING MENU DISPLAY METHOD

CROSS REFERENCES TO RELATED APPLICATIONS

The present invention contains subject matter related to Japanese Patent Application JP 2005-217290 filed in the Japanese Patent Office on Jul. 27, 2005, the entire contents of which are incorporated herein by reference.

BACKGROUND OF THE INVENTION

1. Field of the Invention

The present invention relates to playback apparatuses, menu display methods, and recording media recording programs thereon implementing the menu display methods. The present invention is applicable to in-vehicle playback apparatuses. More particularly, the present invention provides an intermediate layer menu screen so as to display hierarchal menu screens for selection of content. The intermediate layer menu screen displays both a menu selected in an upper layer menu screen and a plurality of menus displayed in a lower layer menu screen. This allows a user to easily recognize the relationship between the upper layer and the lower layer, even if the menu screen has been shifted to the lower layer.

2. Description of the Related Art

With improvements in the performance of CPUs (Central Processing Units) and various devices, in-vehicle apparatuses having not only a function for playing back music and video contents but also a navigation function have been available in recent years. Menu display methods applicable to such apparatuses that play back the contents have been suggested (see, for example, Japanese Unexamined Patent Application Publication No. 2002-82746). In the method described in the above-cited patent document, the menu screens for selection of content are displayed in a hierarchical structure.

By displaying hierarchical menu screens for selection of content, the target contents to be selected are gradually narrowed as the layer of the menu screen shifts from an upper layer to a lower layer. This allows a user to rapidly and certainly select a desired content from many contents.

However, in known hierarchical menu screen display methods, it is difficult to recognize the relationship between an upper layer and a lower layer after the menu screen has been shifted to the lower layer. Depending on circumstances, it may be impossible to find a desired content if the destination of the desired content becomes unknown in the lower layer menu screen. This occurs, for example, when the upper layer menu screen has been shifted to the wrong lower layer menu screen due to the selection of a wrong menu. In such a case, the user has to return to the upper layer menu screen, and then shift to the correct lower layer menu screen again. However, once the menu screen has been shifted to the lower layer, the user has difficulty in recognizing the relationship between the upper layer and the lower layer. Thus, it becomes difficult to know the upper layer menu screen where the wrong menu selection has been made in the lower layer menu screen. As a result, the user takes a long time to return to the upper layer menu screen, or gives up the selection of the content.

SUMMARY OF THE INVENTION

In view of the above-described disadvantage, embodiments of the present invention provide a playback apparatus, a menu display method, and a recording medium recording a program thereon implementing the menu display method. More specifically, the embodiments of the present invention enable easy recognition of the relationship between the upper layer and the lower layer by displaying hierarchical menu screens for selection of content, even if the menu screen has been shifted to the lower layer.

To this end, an embodiment of the present invention is applicable to a playback apparatus for playing back and providing contents to a user. The playback apparatus includes a menu screen display unit, an input unit, and a control unit. The menu screen display unit displays a menu screen of the contents. The input unit detects a user's input operation so as to detect a selection of the content shown in the menu screen. The control unit causes the menu screen display unit to switch the menu screen on the basis of the user's operation detected by the input unit, and instructs a playback operation of the selected content. The menu screen display unit, under the control of the control unit, switches an upper layer menu screen to and from a lower layer menu screen through an intermediate layer menu screen therebetween. The upper layer menu screen shows categories of the contents providable to the user using menus. The lower layer menu screen shows some of the contents, which are classified into one of the categories displayed as the menus in the upper layer menu screen, using menus. The intermediate layer menu screen displays the menu selected in the upper layer menu screen in an area and a plurality of menus displayed in the lower layer menu screen in another area.

Another embodiment of the present invention is applicable to a menu display method for displaying menu screens, in which a user's selection of content is accepted. The menu display method includes the steps of displaying an upper layer menu screen, displaying an intermediate layer menu screen, displaying a lower layer menu screen, and switching the upper layer menu screen, the intermediate layer menu screen, and the lower layer menu screen in response to a user's operation. The upper layer menu screen shows categories of the contents providable to the user using menus. The lower layer menu screen shows some of the contents, which are classified into one of the categories displayed as the menus in the upper layer menu screen, using menus. The intermediate layer menu screen displays the menu selected in the upper layer menu screen in an area, and displays a plurality of menus displayed in the lower layer menu screen in another area.

A still another embodiment of the present invention is applicable to a recording medium recording a program thereon allowing a processor to execute a menu display process, for displaying menu screens in which a user's selection of content is accepted. The process includes the steps of displaying an upper layer menu screen, displaying an intermediate layer menu screen, displaying a lower layer menu screen, and switching the upper layer menu screen, the intermediate layer menu screen, and the lower layer menu screen in response to a user's operation. The upper layer menu screen shows categories of the contents providable to the user using menus. The lower layer menu screen shows some of the contents, which are classified into one of the categories displayed as the menus in the upper layer menu screen, using menus. The intermediate layer menu screen displays the menu selected in the upper layer menu screen in an area, and displays a plurality of menus displayed in the lower layer menu screen in another area.

The above-described embodiment of the present invention is applicable to the playback apparatus for playing back and providing contents to the user. The playback apparatus includes the menu screen display unit, the input unit, and the control unit. The menu screen display unit displays the menu screen of the contents. The input unit detects a user's input operation so as to detect the selection of the content shown in the menu screen. The control unit causes the menu screen display unit to switch the menu screen on the basis of the user's operation detected by the input unit, and instructs the playback operation of the selected content. The menu screen display unit, under the control of the control unit, switches the upper layer menu screen to and from the lower layer menu screen through the intermediate layer menu screen therebetween. The upper layer menu screen shows categories of the contents providable to the user using menus. The lower layer menu screen shows some of the contents, which are classified into one of the categories displayed as the menus in the upper layer menu screen, using menus. The intermediate layer menu screen displays the menu selected in the upper layer menu screen in an area and a plurality of menus displayed in the lower layer menu screen in another area. Accordingly, the intermediate layer menu screen enables an easy recognition of the relationship between the upper layer and the lower layer. Such hierarchical menu screens for selection of content allows the user to easily recognize the relationship between the upper layer and the lower layer even if the menu screen has been shifted to the lower layer.

The above-described embodiments also provide the menu display method and the recording medium recording the program implementing the menu display method thereon. The menu display method and the recording medium allows the user to easily recognize the relationship between the upper layer and the lower layer by displaying the hierarchical menu screens for selection of content even if the menu screen has been shifted to the lower layer.

The above-described embodiments of the present invention allows the user to easily recognize the relationship between the upper layer and the lower layer by displaying the hierarchical menu screens for selection of content even if the menu screen has been shifted to the lower layer.

BRIEF DESCRIPTION OF THE DRAWINGS

FIG. 14 is a plan view showing a process of switching an intermediate menu screen shown in FIG. 8 to an intermediate menu screen shown in FIG. 9;

DESCRIPTION OF THE PREFERRED EMBODIMENTS

Embodiments of the present invention will be described in detail below with reference to drawings.

Embodiment 1

(1) Configuration of Embodiment

Figure 2:
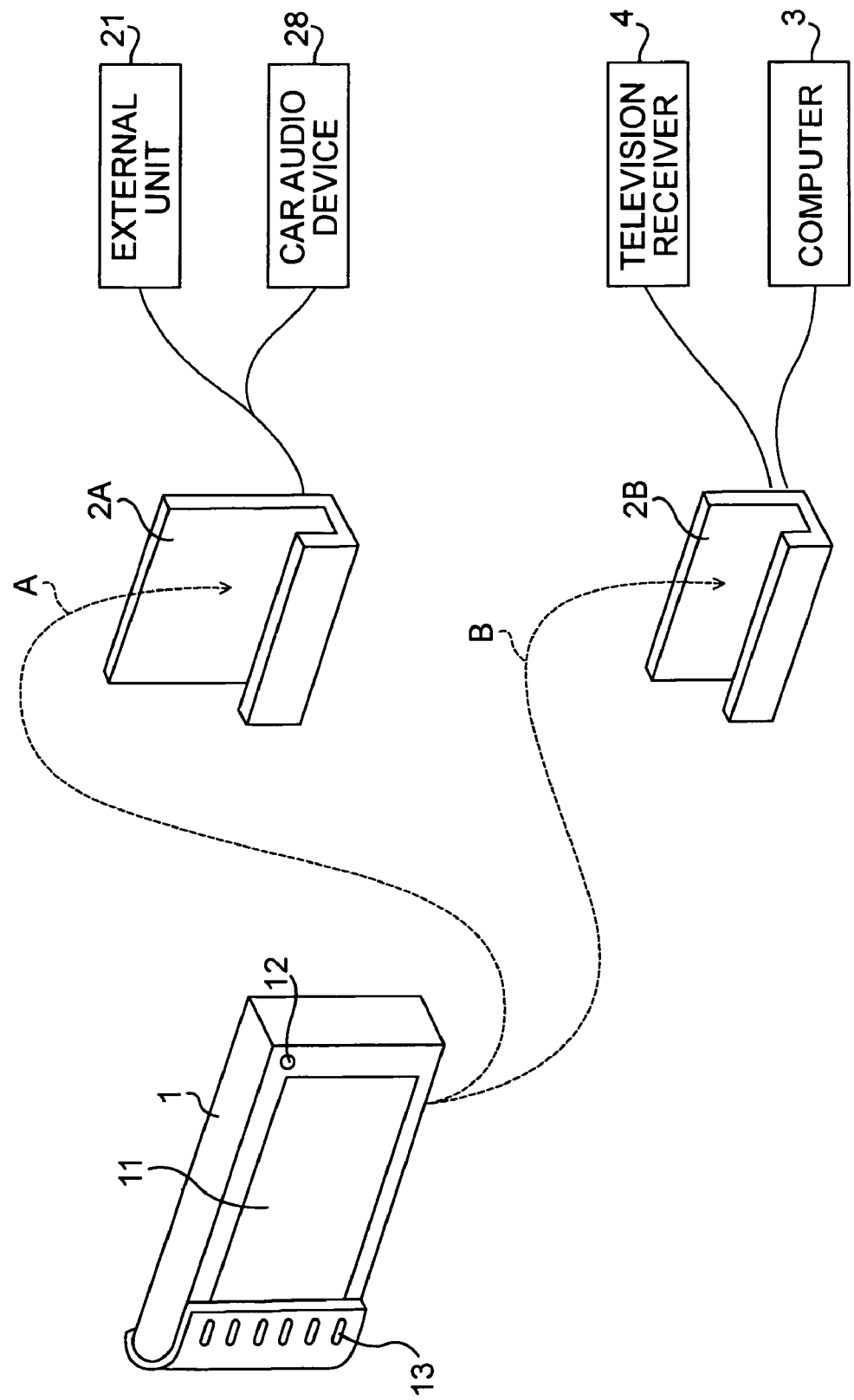
FIG. 2 is a perspective view illustrating an application of an in-vehicle apparatus according to a first embodiment.

FIG. 2 is a perspective view showing an in-vehicle apparatus 1 according to an embodiment of the present invention. The in-vehicle apparatus 1, which is a multimedia terminal, has a function of a navigation system and a function of a content providing apparatus for playing audio and video contents. The in-vehicle apparatus 1 is formed in a plate-like shape with a predetermined thickness. As indicated by Arrow A, the in-vehicle apparatus 1 is mountable in a vehicle with a cradle for vehicle use (hereinafter, referred to as "in-vehicle cradle") 2A disposed at, for example, the center console of the vehicle. The in-vehicle apparatus 1 has various ports, such as input/output ports for various data, at a lower surface thereof. While set on the in-vehicle cradle 2A, the in-vehicle apparatus 1 is supplied with power from the in-vehicle cradle 2A via the ports disposed at the lower surface. The in-vehicle apparatus 1 also inputs and outputs various data used for operations via the in-vehicle cradle 2A.

The in-vehicle apparatus 1 is removable from the in-vehicle cradle 2A, and is portable. As indicated by Arrow B, the in-vehicle apparatus 1 is connectable to a computer 3 and a television receiver 4 with a cradle for home use (hereinafter, referred to as "home cradle") 2B placed, for example, at home. When connected to the computer 3 via the home cradle 2B, the in-vehicle apparatus 1 is used to upload or download various files used for the operations as a multimedia terminal. More specifically, with the activation of an application program for the in-vehicle apparatus 1, predetermined files stored in the computer 3 are uploaded to the in-vehicle apparatus 1 via the home cradle 2B. Additionally, predetermined files stored in the in-vehicle apparatus 1 are downloaded to the computer 3. In this embodiment, the predetermined files to be uploaded or downloaded may be, for example, music content files, video content files, email files, and map files used for the navigation.

When connected to the television receiver 4 via the home cradle 2B, the in-vehicle apparatus 1 (i.e., multimedia terminal) provides various contents to a user via the television receiver 4. In addition, the in-vehicle apparatus 1 displays a map on the television receiver 4, and executes processing relating to navigation functions, such as a route search.

The in-vehicle apparatus 1 has a display screen 11, for displaying contents when mounted on the vehicle, at a front face thereof. A power switch 12 is also provided at the upper right part of the surface where the display screen 11 is disposed. Operation buttons, such as buttons for adjusting volume, are provided at an operation panel disposed on the opposite side of the power switch 12.

Figure 3:
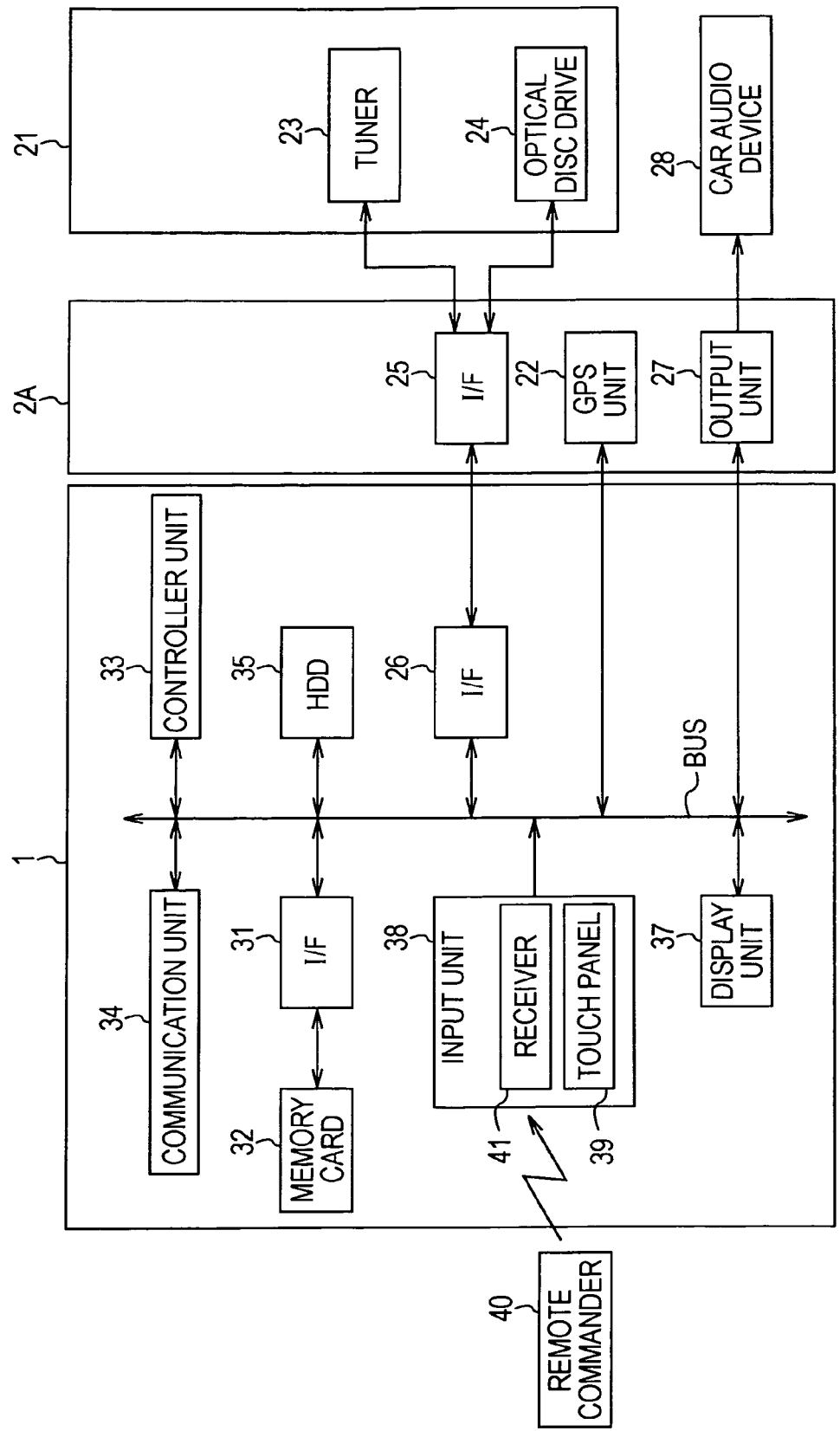
FIG. 3 is a block diagram showing configurations of an in-vehicle apparatus shown in FIG. 2 and related devices.

FIG. 3 is a block diagram showing configurations of the in-vehicle apparatus 1 and related devices. The in-vehicle apparatus 1 is connected to an external unit 21 via the in-vehicle cradle 2A. The external unit 21, provided, for example, under the seat, includes a tuner 23 and an optical disc drive 24.

Under the control of the in-vehicle apparatus 1, the tuner 23 receives television broadcast waves and traffic information regarding VICS (Vehicle Information and Communication System), and outputs the received video data, audio data, and traffic information to the in-vehicle cradle 2A. Likewise, under the control of the in-vehicle apparatus 1, the optical disc drive 24 plays back optical discs, such as DVDs (Digital Versatile Discs) and Compact Discs, and outputs video data and audio data to the in-vehicle cradle 2A.

The in-vehicle cradle 2A has a GPS (Global Positioning System) unit 22, an interface (I/F) 25, and an output unit 27 for audio data. The GPS unit 22 is a current location detection unit relating to the GPS. Under the control of the in-vehicle apparatus 1, the GPS unit 22 detects the current location, and outputs this information to the in-vehicle apparatus 1. The interface 25 outputs the data supplied from the tuner 23 and the optical disc drive 24 to the in-vehicle apparatus 1. In addition, the interface 25 outputs various data supplied from the in-vehicle apparatus 1 to the tuner 23 and the optical disc drive 24. The output unit 27 outputs audio data and various control data supplied from the in-vehicle apparatus 1 to a car audio device 28. The car audio device 28 operates according to the control data supplied from the output unit 27, and drives a speaker according to the audio data supplied from the output unit 27.

With the above-described configuration, the in-vehicle apparatus 1 obtains various data used for the operations as the multimedia terminal from the tuner 23, the optical disc drive 24, and the GPS unit 22 via the in-vehicle cradle 2A. In addition, the in-vehicle apparatus 1 outputs audio data of various contents to the car audio device 28.

The in-vehicle apparatus 1 has an interface (I/F) 26 for inputting and outputting various data from and to the interface 25 of the in-vehicle cradle 2A. The in-vehicle apparatus 1 sends and receives various data to and from the tuner 23, the optical disc drive 24, and the GPS unit 22 via the interface 26. When set in the home cradle 2B, the in-vehicle apparatus 1 outputs and inputs the files to be uploaded or downloaded to and from the computer 3, and outputs the video data to the television receiver 4 via the interface 26.

The in-vehicle apparatus 1 also has an interface (I/F) 31 and a controller unit 33. Under the control of the controller unit 33, the in-vehicle apparatus 1 outputs and inputs various data to and from a memory card 32, inserted in a card slot disposed on the side face thereof, via the interface 31. The interface 31 also enables output/input of various data to and from a bus BUS. The interface 31 allows the in-vehicle apparatus 1 to load still images, captured by, for example, a digital camera, using the memory card 32, and to record downloaded still images on the memory card 32.

The in-vehicle apparatus 1 includes a communication unit 34, i.e., a sending/receiving unit used in a wireless LAN (Local Area Network) communication. Under the control of the controller unit 33, the communication unit 34 sends the data supplied from the bus BUS via a network, and receives the desired data via the network and outputs the data to the bus BUS. The in-vehicle apparatus 1 is connected to the Internet via the communication unit 34 to obtain various data used for creating menus regarding music contents uploaded from the computer 3 and to send emails.

A hard disk drive (HDD) 35 stores programs for processing executed by the in-vehicle apparatus 1 and data, such as the content data. Under the control of the controller unit 33, the hard disk drive 35 outputs the data to the bus BUS. More specifically, the hard disk drive 35 stores various file data supplied from the external units via the interfaces 26 and 31, and various data and email data obtained via the communication unit 34. The hard disk drive 35 also outputs the stored data to the bus BUS if necessary. The programs are preinstalled in the hard disk drive 35. Alternatively, the programs may be stored in the hard disk drive 35 by the download of the programs from a recording medium via the interfaces 26 and 31 or from the network via the communication unit 34. In this case, various kinds of recording medium, such as the optical disc, the memory card, and the magnetic tape, may be widely applicable.

A display unit 37 includes, for example, a liquid crystal display for composing the display screen 11 described in FIG. 2. The display unit 37 displays various content data, maps, etc. under the control of the controller unit 33.

An input unit 38 includes a touch panel 39, a receiver 41, and an interface (not shown). The touch panel 39 disposed on the display screen 11 detects user's operations performed thereon. The receiver 41 receives remote control signals transmitted from a remote commander 40. The interface detects the user's operations performed on the operation buttons 13. The input unit 38 notifies the controller unit 33 of the user's operations detected by these configurations.

Figure 4:
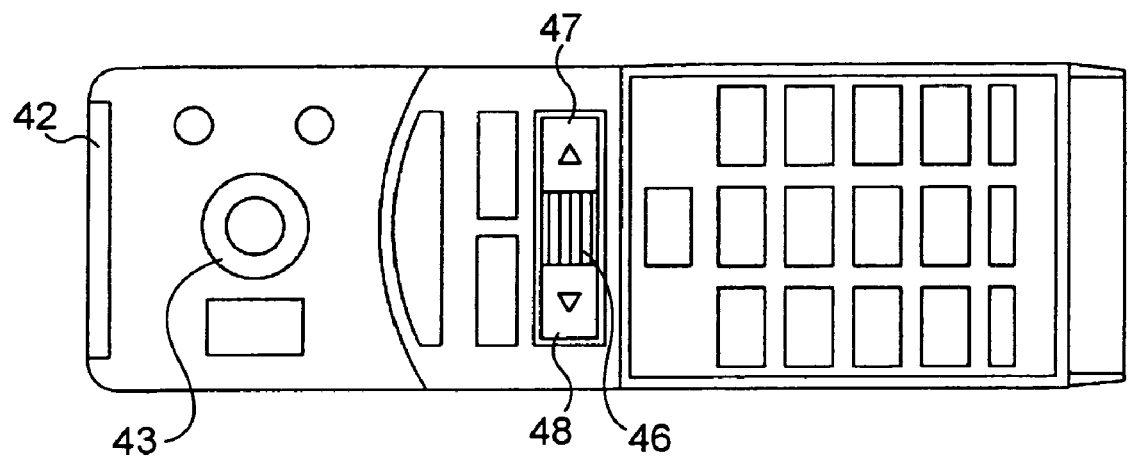
FIG. 4 is a plan view showing a remote commander of an in-vehicle apparatus shown in FIG. 2.

FIG. 4 is a plan view showing the remote commander 40. The remote commander 40 is formed in an elongated plate shape with a predetermined thickness. The remote commander 40 has an infrared transmitter 42 for transmitting remote control signals at one end face of the shorter side. The remote commander 40 has a joystick 43, which is a pressable pointing device, disposed on the upper face with respect to the side where the infrared transmitter 42 is disposed. The remote commander 40 further has a jog dial 46, which is a pressable and rotatable operation button, at the center of the front face. On the left and right of the jog dial 46, a backward button 48 and a forward button 47 are provided, respectively. Furthermore, the remote commander 40 has operation buttons or the like corresponding to the operation buttons 13 provided at the operation panel of the in-vehicle apparatus 1.

Referring back to FIG. 3, the controller unit 33 is an arithmetic unit for controlling the entire operations by executing the programs stored in the hard disk drive 35. If a file of the music content is uploaded to the hard disk drive 35, the controller unit 33 connects to the Internet, accesses a predetermined web page, and obtains menu data used for creating a menu screen of the music content via the communication unit 34. The menu data includes the title of the music content, data regarding the album containing the music content, and data regarding the artist of the music content. The data regarding the album includes the title of the album, the cover image of the album, the total play time, the number of tracks, and the release date. The data regarding the artist includes a picture, the name, discography, and the biography of the artist. The user may apply any images, titles, etc. that the user desires to these data by connecting the in-vehicle apparatus 1 to the computer 3 and executing a predetermined application program.

The controller unit 33 stores the menu data obtained accordingly in the hard disk drive 35, and analyzes the data to build a database of the music contents recorded on the hard disk drive 35. The controller 33 searches the database, and displays hierarchical menu screens used for the selection of the music contents.

More specifically, the controller unit 33 causes the display unit 37 to display various menu screens in response to the user's operations. If the user instructs the playback of the music content, the controller unit 33 instructs the hard disk drive 35 to play back the file of the music content. The controller unit 33 then causes the display unit 37 to display images corresponding to the video data supplied from the hard disk drive 35, and causes the car audio device 28 to play back the audio data of the music content supplied via the output unit 27.

At this time, the controller unit 33 searches the database of the music contents recorded on the hard disk device 35, and displays menu screens for the selection of the music contents based on the result of retrieval. The controller unit 33 accepts the user's selection of the music content in these menu screens.

Figure 5:
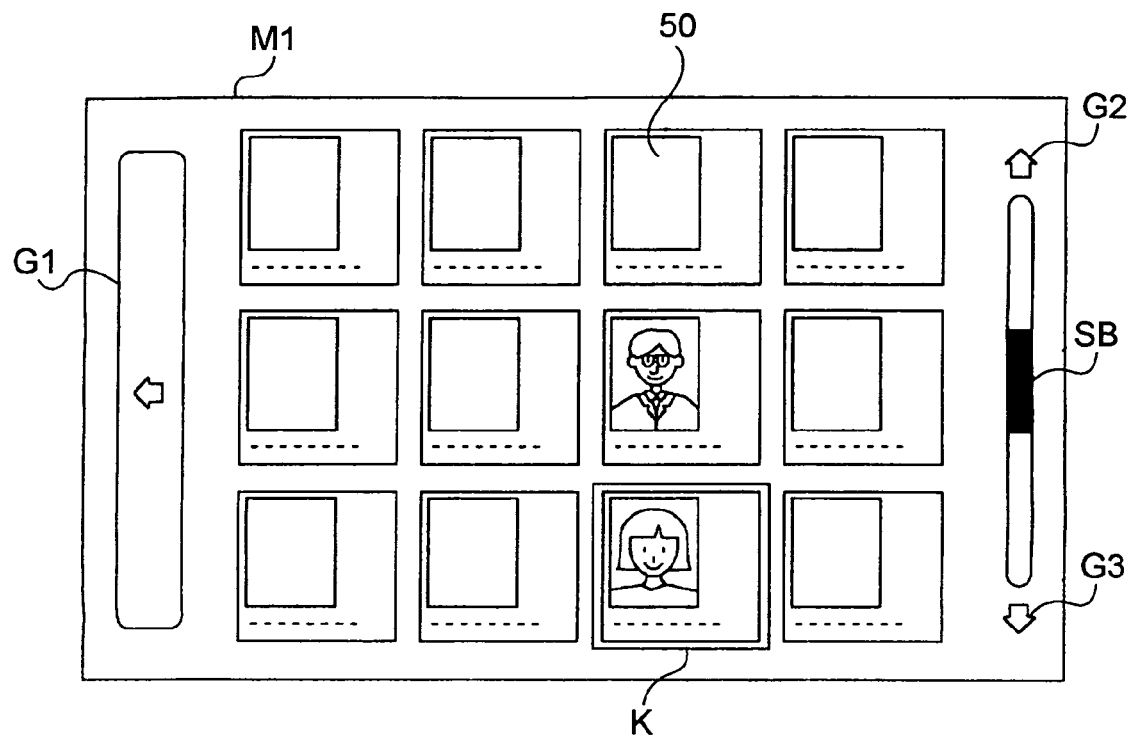
FIG. 5 is a plan view showing an artist layer menu screen used in an in-vehicle apparatus shown in FIG. 2.

FIG. 5 is a plan view showing a top menu screen of the menu screens for the selection of the music contents. The top menu screen M1 shows the music contents that are recorded on the hard disk drive 35 and providable to the users. Menus 50 represent the music contents classified in terms of a major classification parameter. In this embodiment, the music contents are classified in terms of "artists". Accordingly, the top menu screen M1 displays a list of menus 50 each having the name and picture of the artist of the corresponding music content recorded on the hard disk drive 35. Hereinafter, this top menu screen M1 for the selection of the music contents is also referred to as "artist layer menu screen".

The top menu screen M1 also displays a frame K surrounding one of the menus 50. Display switch guides G1, G2, and G3 are displayed on both sides of the screen. A scroll bar SB is displayed on the right side of the screen. The display switch guide G1 disposed on the left is displayed as a large oblong frame. The display switch guide G1 indicates the existence of an upper layer menu screen of the top menu screen M1, i.e., a root menu screen. An outward arrow is displayed inside the frame of the display switch guide G1. This arrow indicates that the top menu screen M1 is switchable to the root menu screen by operating the backward button 48, moving the frame K over this arrow, or touching the touch panel 39 at the place where the arrow is displayed. The display switch guides G2 and G3 disposed on the right are displayed above and below the scroll bar SB as an upward arrow and a downward arrow, respectively. These arrows indicate that the listed menus 50 are scrollable by operating the operation buttons for moving the frame upward and downward.

Figure 6:
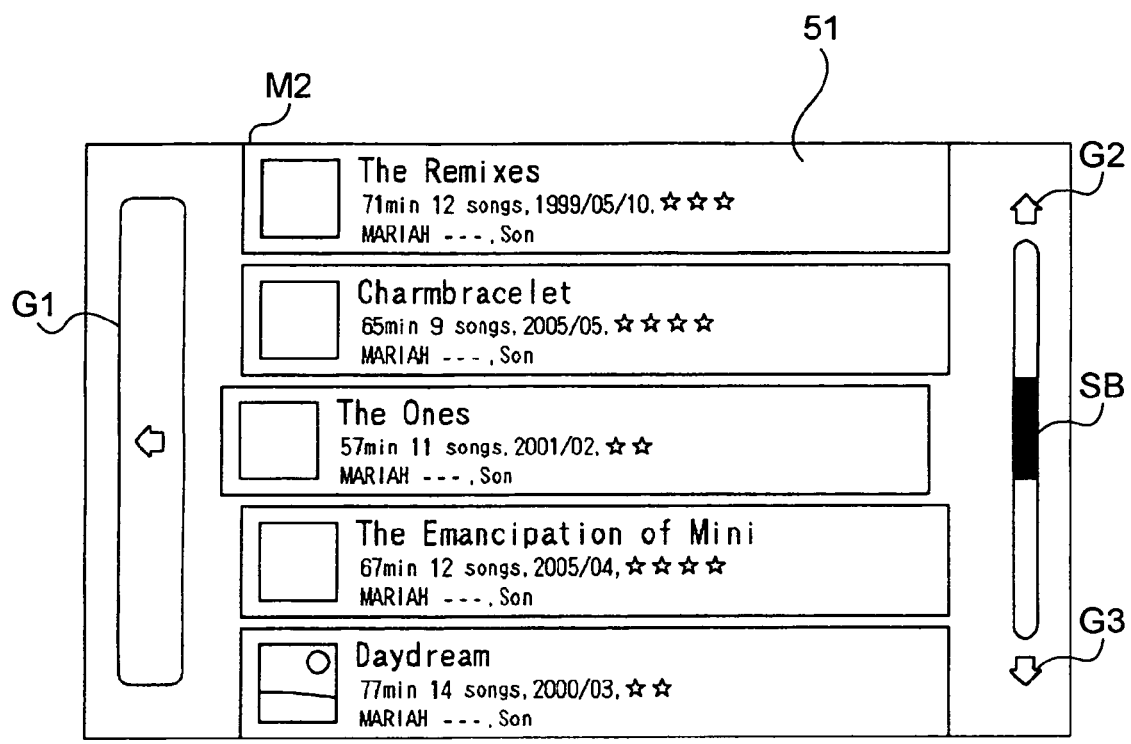
FIG. 6 is a plan view showing an album layer menu screen used in an in-vehicle apparatus shown in FIG. 2.

FIG. 6 is a plan view showing a lower layer menu screen of the top menu screen M1. This lower layer menu screen shows the music contents, classified into the menu 50 selected by the user in the upper layer menu screen, using menus 51. In this embodiment, the music contents are classified in terms of "albums". Hereinafter, this menu screen is also referred to as "album layer menu screen".

The album layer menu screen M2 displays a list of menus 51 each having the cover image of the album, the title of the album, the total play time, the number of tracks, the file creation date, the stars indicating the user's rating, the artist name, and the record company name.

The album layer menu screen M2 has horizontally long menus 51 arranged in a vertical direction of the display screen. Among the menus 51 arranged in the vertical direction, the focused menu 51 is displayed so as to stick out to the left. In addition, as in the case of the top menu screen M1, display switch guides G1, G2, and G3 are displayed on both sides of the screen, and a scroll bar SB on the right side of the screen.

Figure 7:
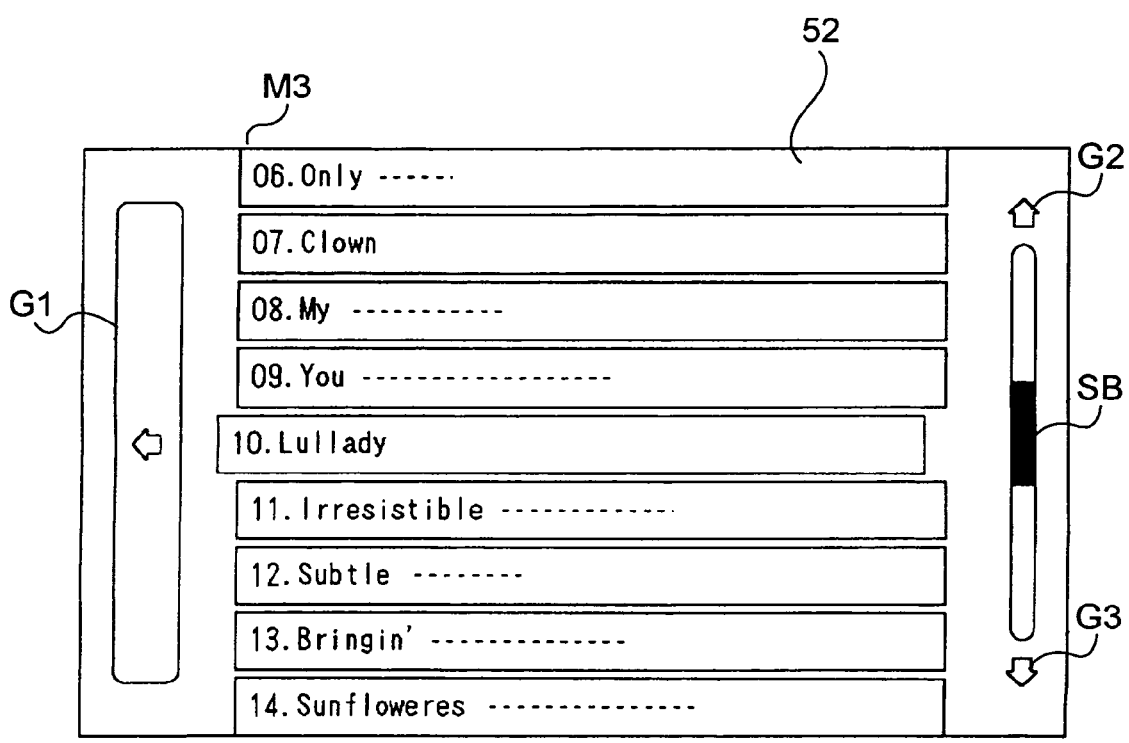
FIG. 7 is a plan view showing a track layer menu screen used in an in-vehicle apparatus shown in FIG. 2.

FIG. 7 is a plan view showing a lower layer menu screen of the album layer menu screen M2. This lower layer menu screen shows the music contents, classified into the menu 51 selected by the user in the album (upper) layer menu screen M2, using menus 52. Hereinafter, this menu screen is also referred to as "track layer menu screen".

The track layer menu screen M3 has a list of menus 52 each having the title of the music content (i.e., the title of the song) and the track number. The track layer menu screen M3 has horizontally long menus 52 arranged in a vertical direction of the display screen. Among the menus 52 arranged in the vertical direction, the focused menu 52 is displayed so as to stick out to the left. In addition, as in the case of the album layer menu screen M2, display switch guides G1, G2, and G3 and scroll bar SB are displayed on both sides and on the right side of the screen, respectively.

Accordingly, the in-vehicle apparatus 1 displays hierarchical menu screens for the selection of the music contents using the menu screens M1 to M3, and accepts the user's selection of the music content. Since each menu screen M1 to M3 displays the music contents, classified into one category in the upper layer, using menus, more detailed information of the music contents is provided as the menu screen is shifted to the lower layer. This improves the usability of the in-vehicle apparatus 1. Furthermore, intermediate layer menu screens are provided between the menu screens M1 and M2 and between the menu screens M2 and M3.

Figure 8:
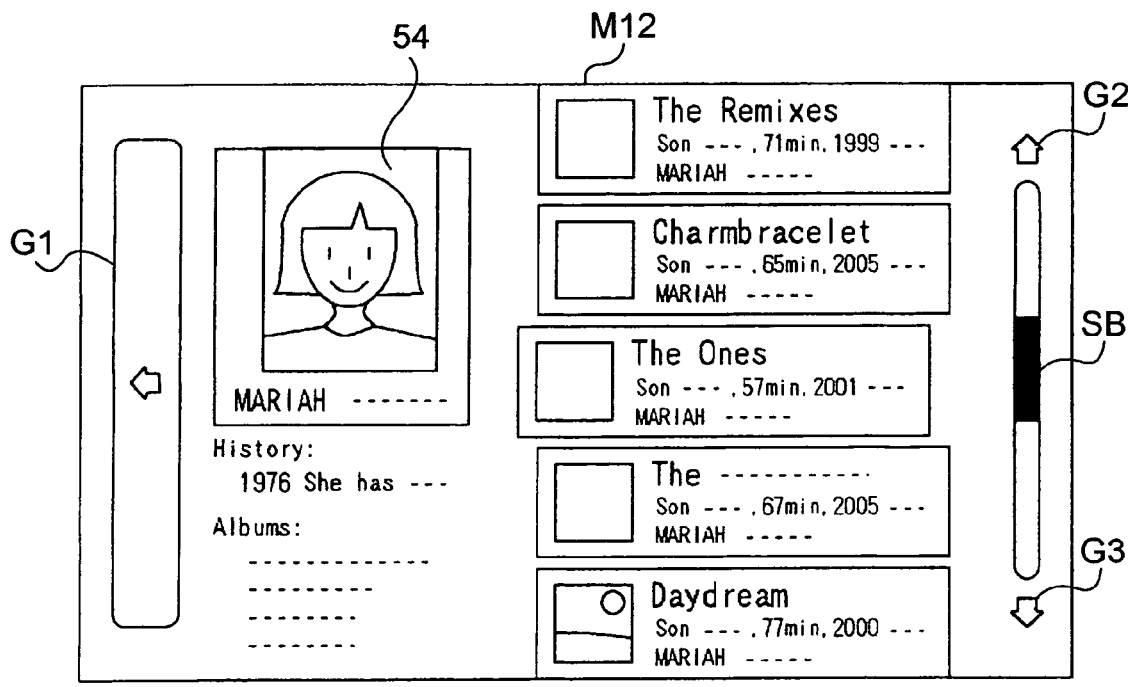
FIG. 8 is a plan view showing an intermediate layer menu screen, provided between an artist layer and an album layer, used in an in-vehicle apparatus shown in FIG. 2.

FIG. 8 is a plan view showing the intermediate layer menu screen M12 between the artist layer menu screen M1 and the album layer menu screen M2. The intermediate layer menu screen M12 displays two areas separated at the center of the display screen. In the left area, an enlarged image 54 of the menu 50 selected in the artist (upper) layer menu screen M1 is displayed. The biography and discography of the artist are displayed below the enlarged image 54. In the right area, a plurality of menus displayed in the album (lower) layer menu screen M2 is displayed. As in the case of the album layer menu screen M2, display switch guides G1, G2, and G3 and a scroll bar SB are displayed on both sides and on the right side of the screen, respectively.

Figure 9:
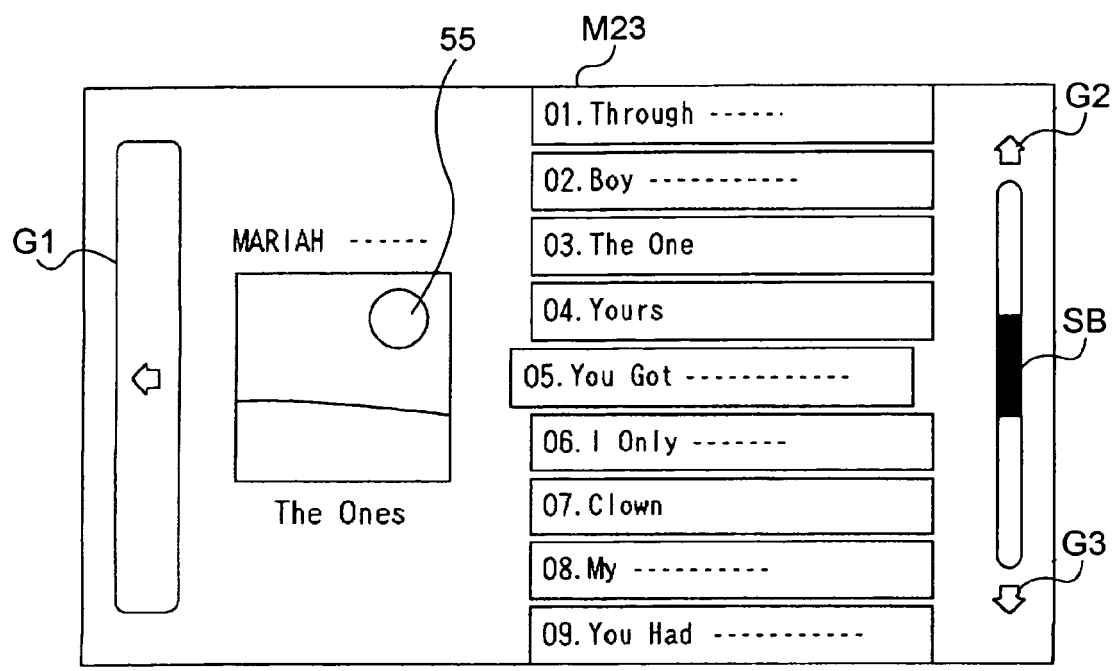
FIG. 9 is a plan view showing an intermediate layer menu screen, provided between an album layer and a track layer, used in an in-vehicle apparatus shown in FIG. 2.

FIG. 9 is a plan view showing the intermediate layer menu screen M23 between the album layer menu screen M2 and the track layer menu screen M3. As in the case of the intermediate layer menu screen M12, the intermediate layer menu screen M23 displays two areas on the display screen. In the left area, an enlarged image 55 of part of the menu 51 selected in the album (upper) layer menu screen M2 is displayed. In this embodiment, the cover image displayed in the menu 51 is used as the enlarged image 55. The artist name, displayed in the corresponding menu 50 of the top menu screen M1, is displayed above the enlarged image 55. The title of the album is displayed below the enlarged image 55.

In the right area, a plurality of menus displayed in the track (lower) layer menu screen M3 is displayed. As in the case of the album layer menu screen M2, display switch guides G1, G2, and G3 and a scroll bar SB are displayed on both sides and on the right side of the screen, respectively.

In this embodiment, the hierarchical menu screens are displayed. Furthermore, the intermediate layer menu screens that display both the upper layer information and the lower layer information are provided. This allows the user to easily recognize the relationship between the upper layer and the lower layer, even if the menu screen has been shifted to the lower layer. Accordingly, the controller unit 33 switches the menu screens M1 to M3 with or without displaying the intermediate layer menu screens M12 and M23 in response to the user's operations.

Figure 1:
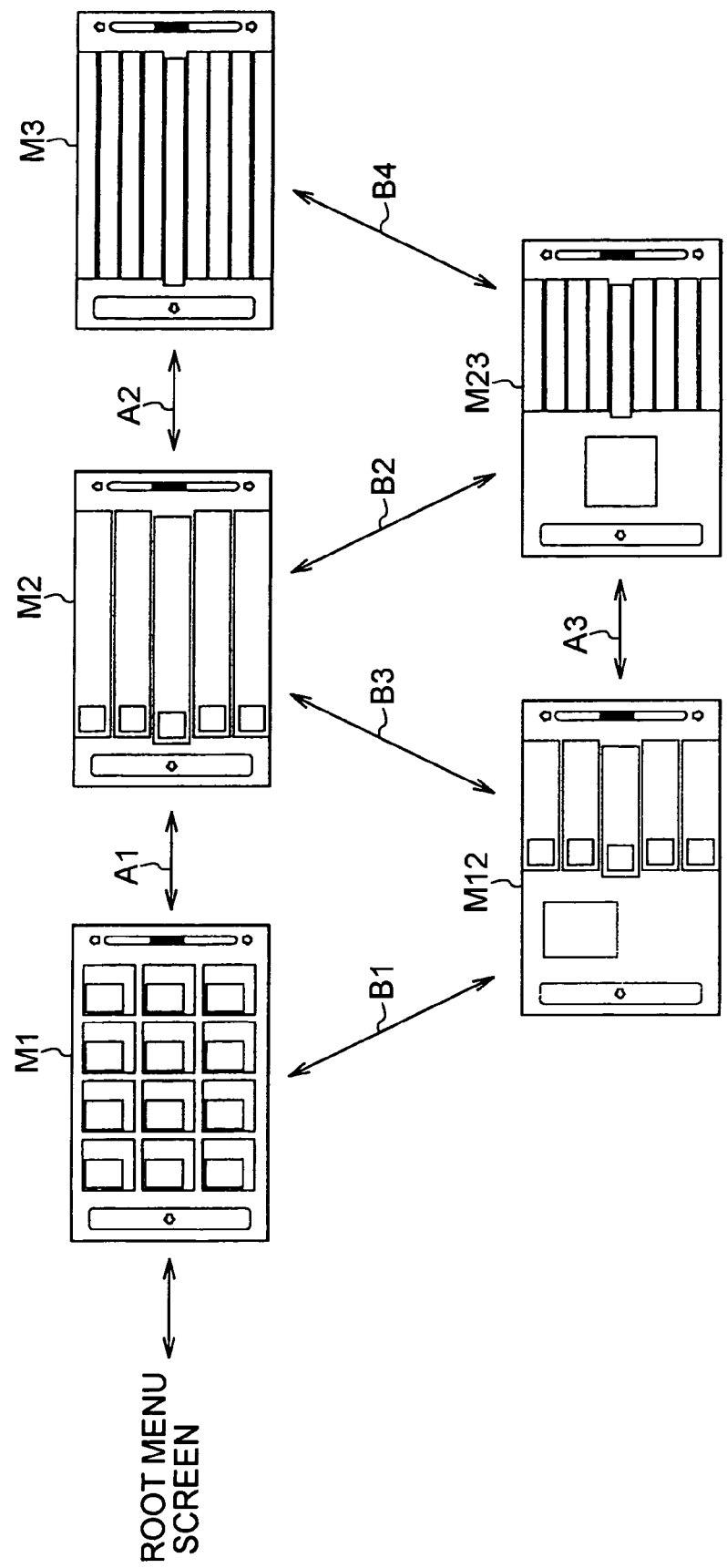
FIG. 1 is a plan view showing a relationship of menu screens used in an in-vehicle apparatus according to a first embodiment.

More specifically, if the user selects a menu for instructing the playback of the music contents in the root menu screen, the controller unit 33 causes the display unit 37 to display the artist layer menu screen M1, as shown in FIG. 1. The user selects the menu in the following manner. The user first moves the focus to the target menu by operating the joystick 43 upward and downward, to the left and right, rotating the jog dial 46, or pressing the forward and backward buttons 47 and 48. The user then sets the selection of the menu by pressing the joystick 43 or the jog dial 46. Alternatively, the user selects the menu by touching the touch panel 39 at the target menu with, for example, a finger. When the input unit 38 detects the user's operation performed in the root menu screen, the controller unit 33 causes the display unit 37 to display the artist layer menu screen M1.

After the artist layer menu screen M1 is displayed, the controller unit 33 causes the focus to move upward and downward, to the left and right, or the listed menus 50 to be scrolled upward and downward in response to the user's operation, such that the focus is moved to the menu 50 that the user desires. The user's operation may be the operation of the joystick 43 upward and downward, to the left and right, the rotation of the jog dial 46, the press operation of the forward and backward buttons 47 and 48, or the operation of the scroll bar SB detected by the touch panel 39. Then, in response to the press operation of the joystick 43 or the jog dial 46, the controller unit 33 switches the menu screen to the lower layer menu screen corresponding to the focused menu 50. Alternatively, if the touch operation of the menu 50 with a finger is detected by the touch panel 39, the controller unit 33 switches the menu screen to the lower layer menu screen corresponding to the touched menu 50.

At this time, the controller unit 33 determines the period of time during which the joystick 43 or the jog dial 46 has been pressed or the menu 50 has been touched. When the period during which the joystick 43 or the jog dial 46 has been pressed or the menu 50 has been touched is equal to or longer than a predetermined period, the menu screen is switched to the album (lower) layer menu screen M2 as indicated by Arrow A1 in FIG. 1. In contrast, when the period during which the joystick 43 or the jog dial 46 has been pressed or the menu 50 has been touched is shorter than the predetermined period, the menu screen is switched to the intermediate layer menu screen M12 between the artist layer and the album layer as indicated by Arrow B1 in FIG. 1.

Figure 10:
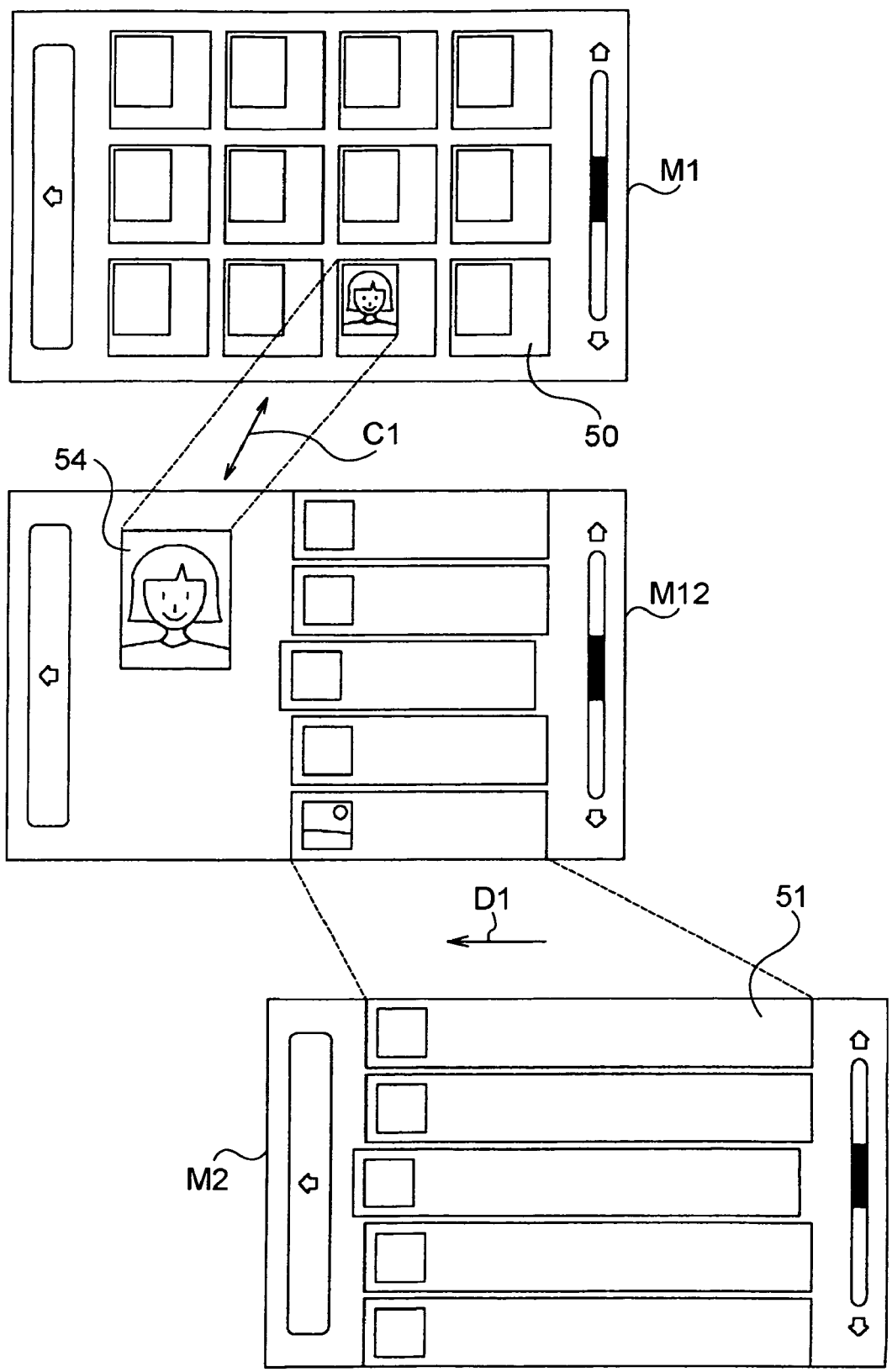
FIG. 10 is a plan view showing a process of switching an artist layer menu screen to an intermediate layer menu screen shown in FIG. 8.

At this time, the controller unit 33 switches the menu screen to the intermediate layer menu screen M12 while changing the menus to be displayed in the intermediate layer menu screen M12 via animation. More specifically, when switching the menu screen to the intermediate layer menu screen M12, the controller 33 gradually enlarges and moves the picture and name of the artist, included in the menu 50 selected by the user, to the display position of the enlarged image 54 as indicated by Arrow C1 shown in FIG. 10. In addition, as indicated by Arrow D1, the controller 33 gradually enlarges each of the plurality of the menus 51, displayed in the album layer menu screen M2, from the right side to the center of the screen, such that the menus 51 are configured to fade in the intermediate layer menu screen M12. Accordingly, when the menu screen is switched to the intermediate layer menu screen M12, the picture and name of the artist displayed in the artist layer menu screen M1 and the menus 51 displayed in the lower layer menu screen M2 are gradually changed. In addition, part that is not hidden by the enlarged picture of the artist, name of the artist, and menus 51 is configured to cross-fade into the intermediate layer menu screen M12.

On the other hand, if the backward button 48 provided on the remote commander 40 is operated or the touch operation of the display switch guide G1 disposed on the left is detected by the touch panel 39 while displaying the artist layer menu screen M1, the controller unit 33 switches the menu screen to the root menu screen.

After displaying the album layer menu screen M2, the controller unit 33 causes the focus set on one of the menus 51 to move upward and downward or the listed menus 51 to be scrolled upward and downward in response to the user's operation, such that the focus is moved to the menu 51 that the user desires. The user's operation may be the operation of the joystick 43 upward and downward, the rotation of the jog dial 46, or the operation of the scroll bar SB detected by the touch panel 39. Then, in response to the press operation of the joystick 43 or the jog dial 46, the controller unit 33 instructs the playback of the music contents, recorded on the hard disk drive 35, contained in the album corresponding to the focused menu 51. Alternatively, when the touch operation of the menu 51 with a finger or the like is detected by the touch panel 39, the controller unit 33 also instructs the playback of the music contents corresponding to the touched menu 51.

On the other hand, in response to the operation of the joystick 43 to the right, the press operation of the forward button 47, or the touch operation on the right end of the menu screen detected by the touch panel 39, the menu screen is switched to the lower layer menu screen corresponding to the focused menu 51.

At this time, the controller unit 33 determines the period of time during which the joystick 43 or the forward button 47 has been operated or the touch panel 39 has been touched. If the period of the press operation or the touch operation is equal to or longer than a predetermined period, the menu screen is switched to the track (lower) layer menu screen M3 as indicated by Arrow A2 in FIG. 1. If the period of the press operation or the touch operation is shorter than the predetermined period, the menu screen is switched to the intermediate layer menu screen M23 between the album layer and the track layer as indicated by Arrow B2 in FIG. 1.

Figure 11:
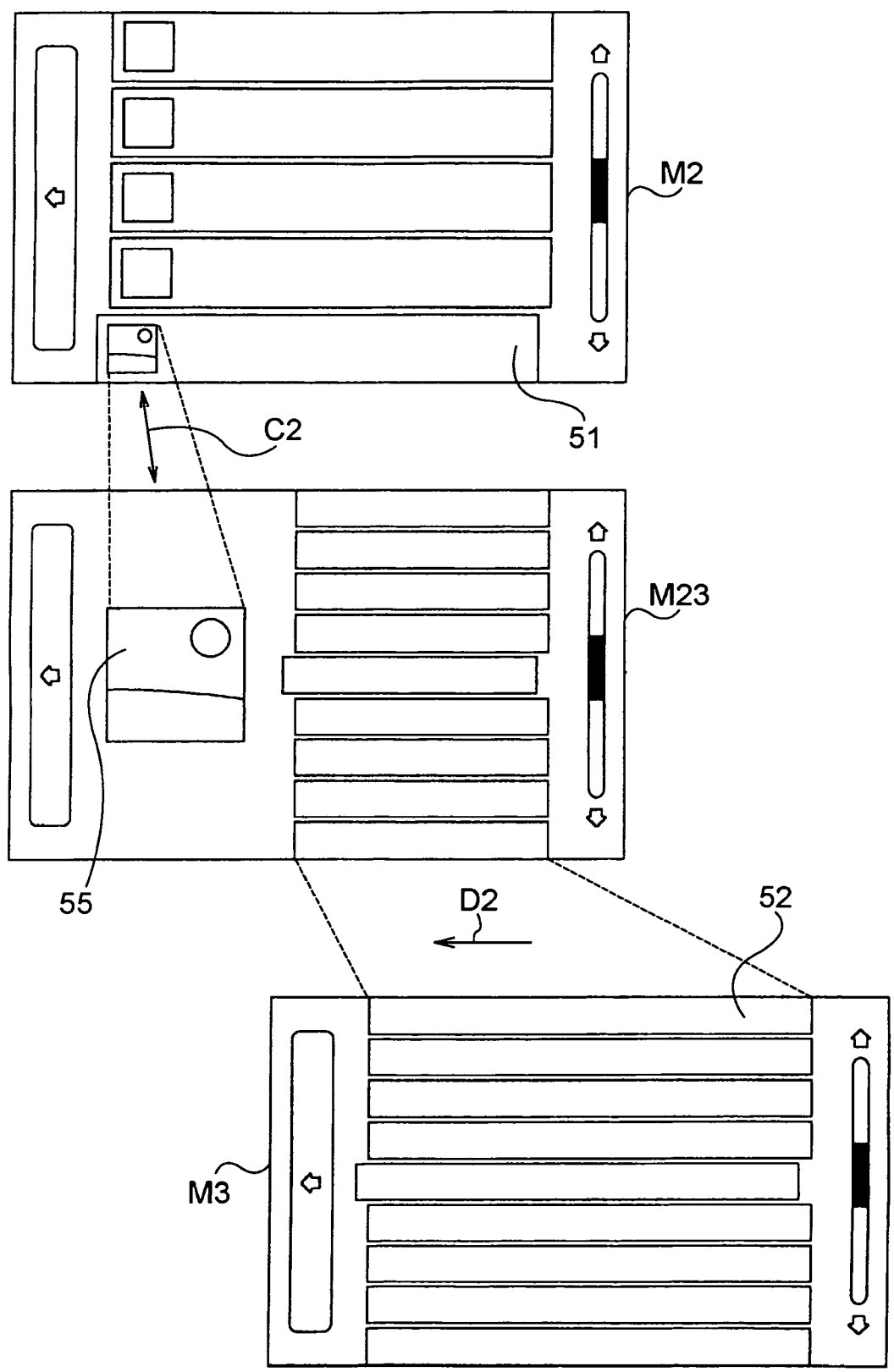
FIG. 11 is a plan view showing a process of switching an album layer menu screen to an intermediate layer menu screen shown in FIG. 9.

Likewise, in this case, the controller unit 33 switches the menu screen to the intermediate layer menu screen M23 while changing the menus to be displayed in the intermediate layer menu screen M23 via animation. More specifically, when switching the menu screen to the intermediate layer menu screen M23, the controller unit 33 gradually enlarges and moves the cover image, included in the menu 51 selected by the user, to the display position of the enlarged image 55 as indicated by Arrow C2 in FIG. 11. In addition, as indicated by Arrow D2, the controller unit 33 gradually enlarges each of the plurality of the menus 52, displayed in the track layer menu screen M3, from the right end to the center of the screen, such that the menus 52 are configured to fade in the intermediate layer menu screen M23. Accordingly, the cover image displayed in the album layer menu screen M2 and the menus 52 displayed in the lower layer menu screen M3 are gradually changed. Part that is not hidden by the cover image and the menus 52 is configured to cross-fade into the intermediate layer menu screen M23.

On the other hand, in response to the user's operation performed while the album layer menu screen M2 is displayed, the controller unit 33 switches the menu screen to the upper layer menu screen. These user's operation may be the press operation of the backward button 48 provided on the remote commander 40, the operation of the joystick 43 to the left, or the touch operation of display switch guide G1, displayed on the left, detected by the touch panel 39.

At this time, the controller unit 33 determines the period of time during which the joystick 43 or backward button 48 has been operated or the touch panel 39 has been touched. If the period of the press operation or the touch operation is equal to or longer than a predetermined period, the menu screen is switched to the artist (upper) layer menu screen M1 as indicated by Arrow A1 in FIG. 1. If the period of the press operation or the touch operation is shorter than the predetermined period, the menu screen is switched to the intermediate layer menu screen M12 between the album layer and the artist layer as indicated by Arrow B3 in FIG. 1.

Figure 12:
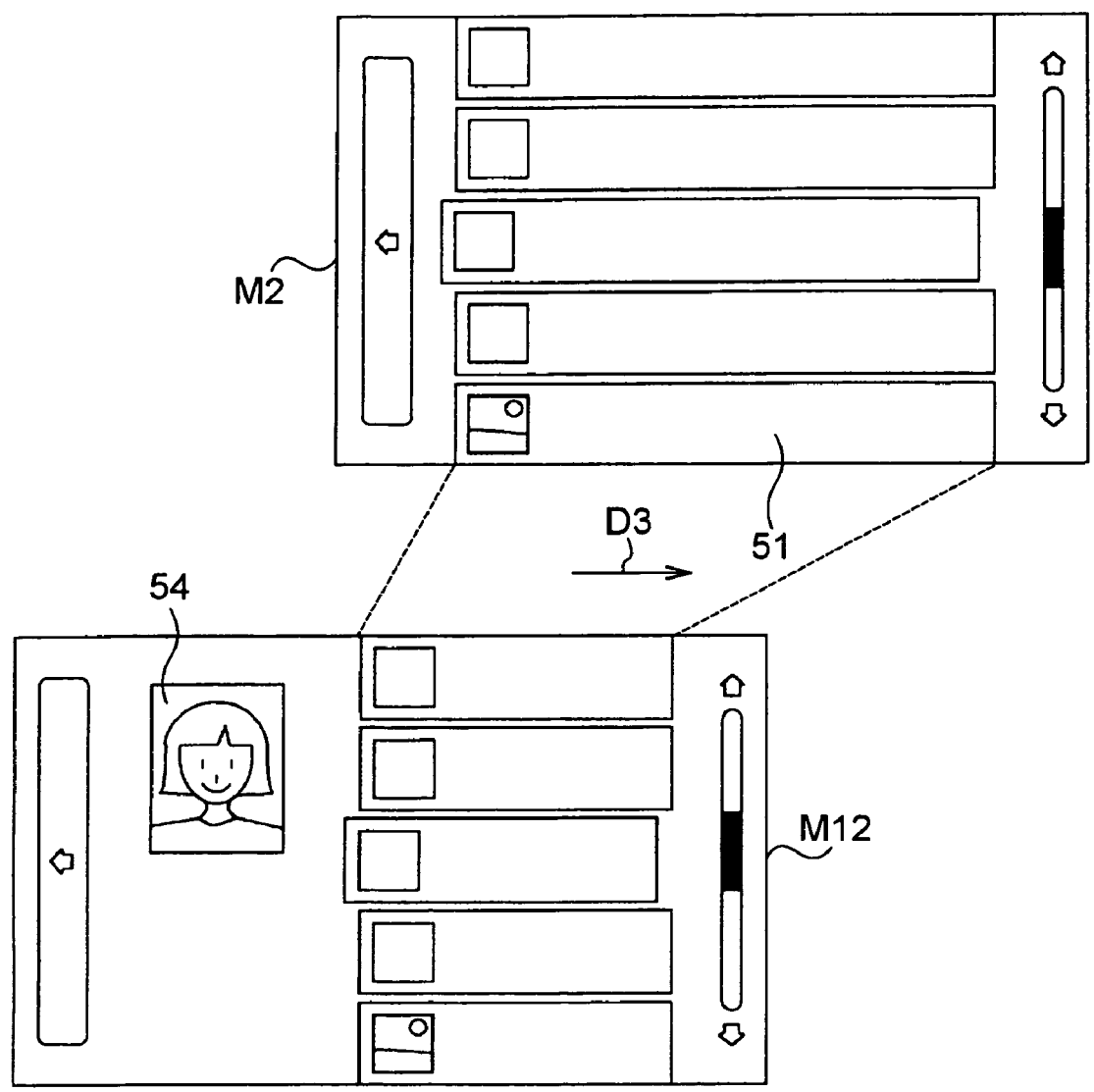
FIG. 12 is a plan view showing a process of switching an album layer menu screen to an intermediate layer menu screen shown in FIG. 8.

Likewise, in this case, as shown in FIG. 12, the controller unit 33 switches the menu screen to the intermediate layer menu screen M12 while changing the menu to be displayed in the intermediate layer menu screen M12 via animation. More specifically, as indicated by Arrow D3, when switching the menu screen to the intermediate layer menu screen M12, the controller unit 33 gradually shortens the width of menus 51 displayed in the album layer menu screen M2 to display the menus 51 on the right. In addition, the enlarged image 54 or the like is configured to fade in the intermediate layer menu screen M12.

After displaying the track layer menu screen M3, the controller unit 33 causes the focus set on one of the menus 52 to move upward and downward or the listed menus 52 to be scrolled upward and downward in response to the user's operation, such that the focus is moved to the menu 52 that the user desires. The user's operation may be the operation of the joystick 43 upward and downward, the rotation of the jog dial 46, or the operation of the scroll bar SB detected by the touch panel 39. Then, in response to the press operation of the joystick 43 or the jog dial 46, the controller unit 33 instructs the playback of the music content corresponding to the focused menu 52. Alternatively, when the touch operation of the menu 52 with a finger or the like is detected by the touch panel 39, the controller unit 33 also instructs the playback of the music content corresponding to the touched menu 52.

In contrast, in response to the operation of the joystick 43 to the left, the press operation of the backward button 48, or the touch operation of the display switch guide G1, displayed on the left of the screen, detected by the touch panel 39, the controller unit 33 switches the menu screen to the upper layer menu screen.

Likewise, at this time, the controller unit 33 determines the period of the press operation or the touch operation. If the period of the press operation or the touch operation is equal to or longer than a predetermined period, the menu screen is switched to the album (upper) layer menu screen M2 as indicated by Arrow A2 in FIG. 1. If the period of the press operation or the touch operation is shorter than the predetermined period, the menu screen is switched to the intermediate layer menu screen M23 between the album layer and the track layer as indicated by Arrow B4 in FIG. 1.

Figure 13:
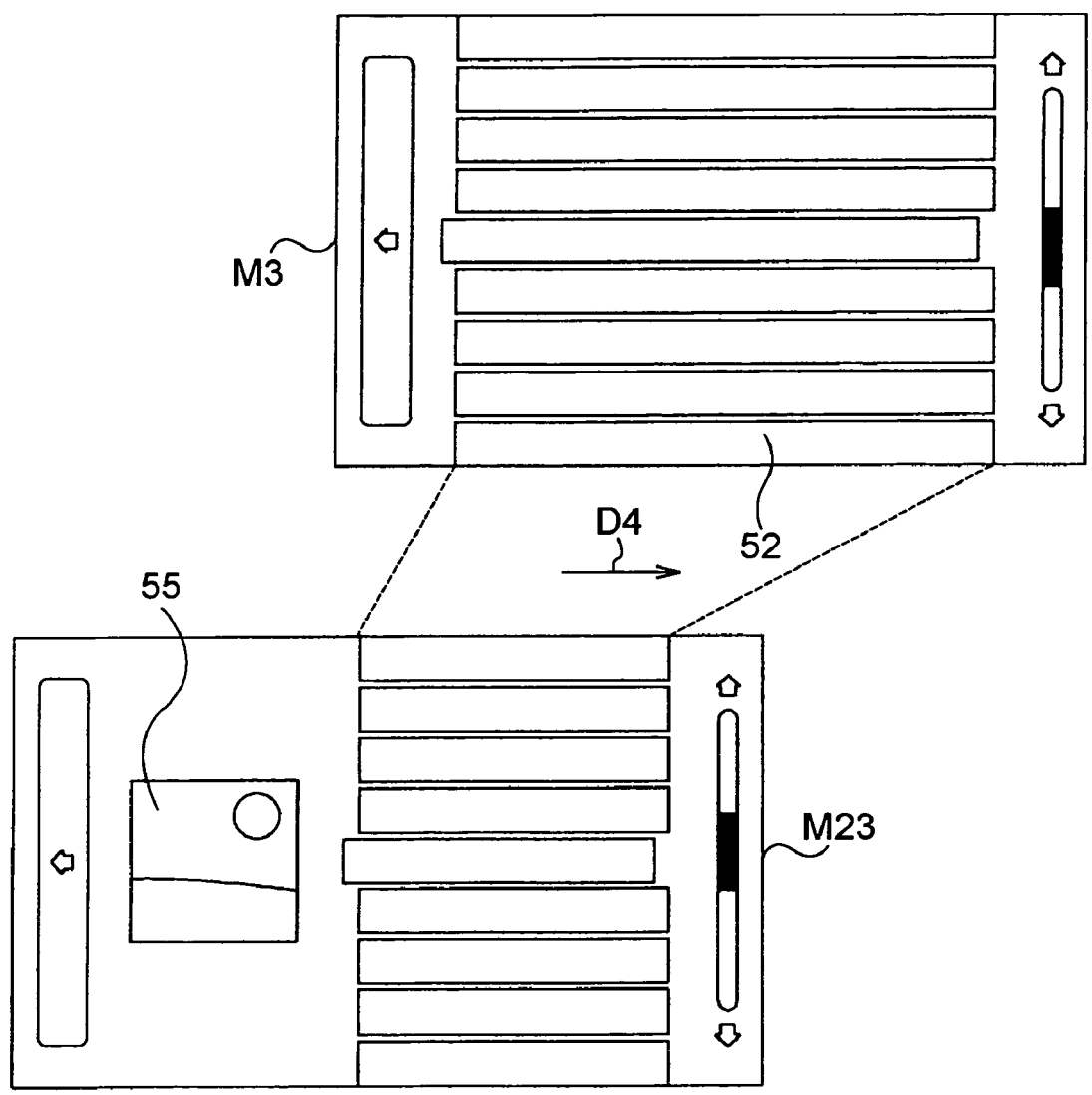
FIG. 13 is a plan view showing a process of switching a track layer menu screen to an intermediate layer menu screen shown in FIG. 9.
Figure 15A:
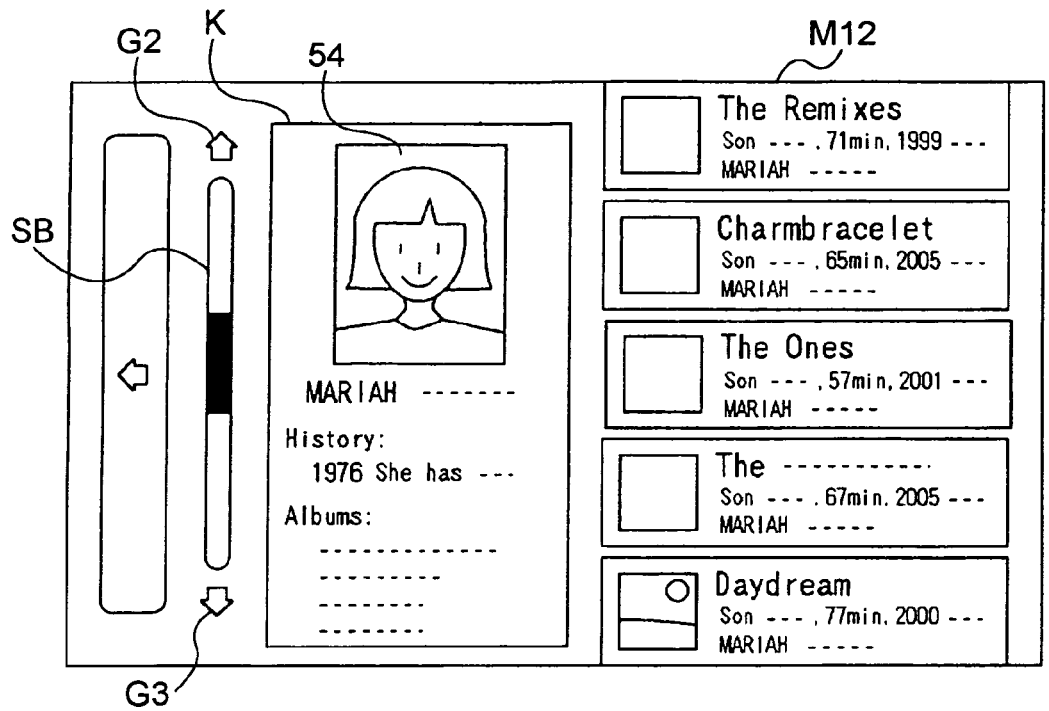
FIGS. 15A and 15B are plan views showing display modes of an intermediate layer menu screen, provided between an artist layer and an album layer, used in an in-vehicle apparatus according to a second embodiment.
Figure 15B:
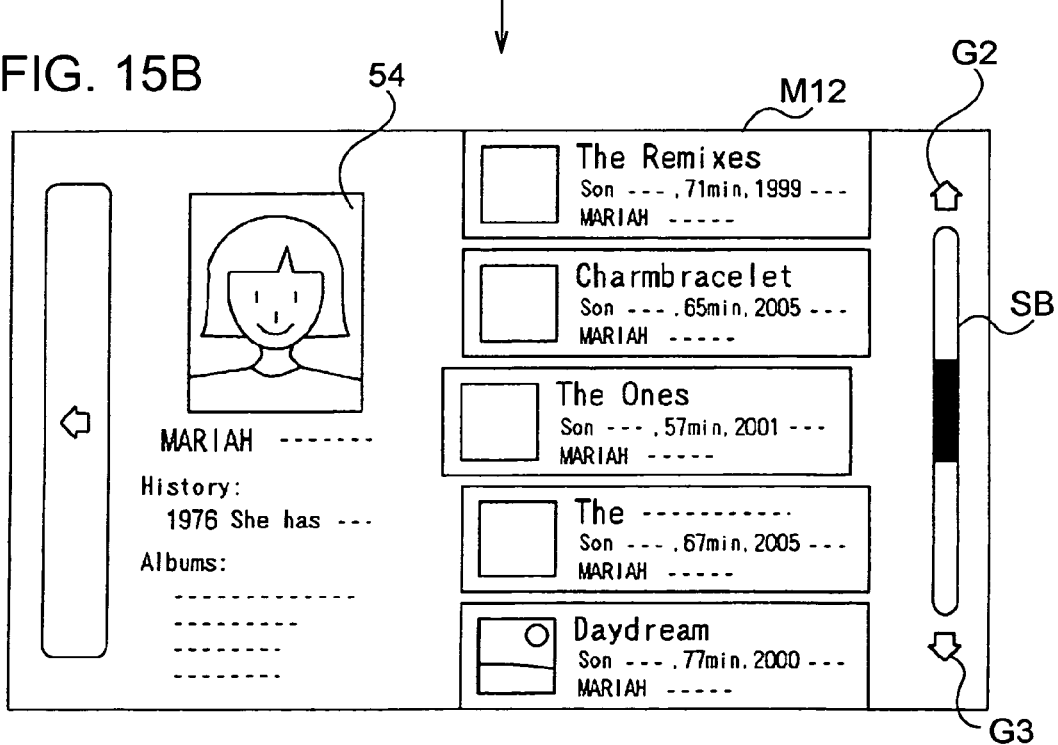
Figure 16A:
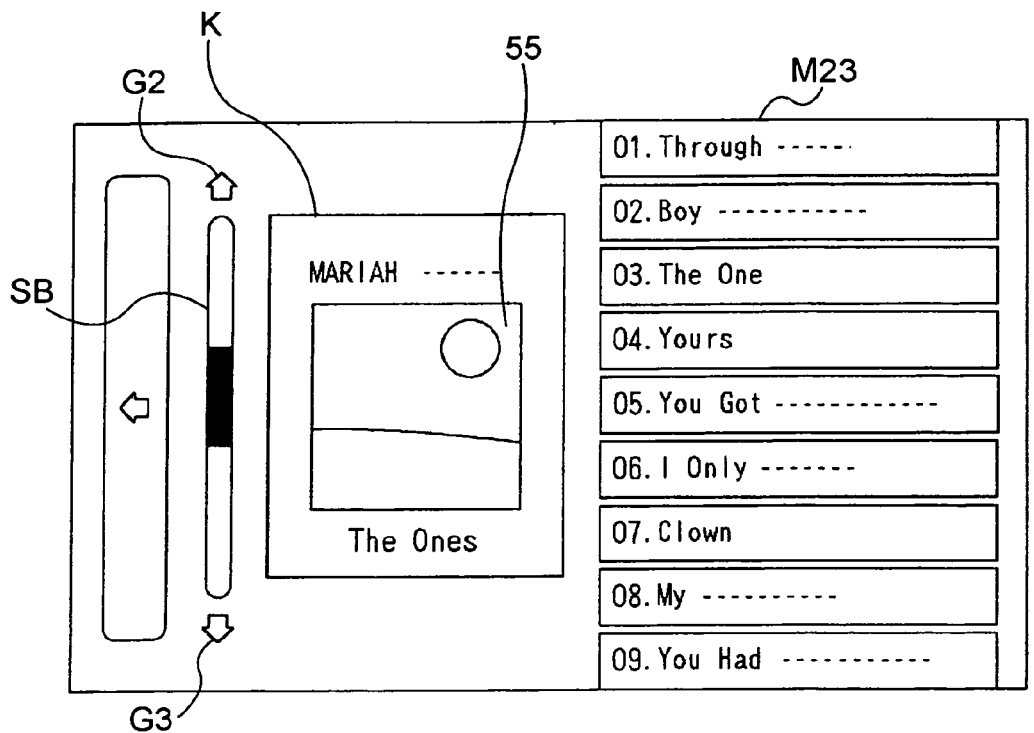
FIGS. 16A and 16B are plan views showing display modes of an intermediate layer menu screen, provided between an album layer and a track layer, corresponding to FIGS. 15A and 15B.
Figure 16B:
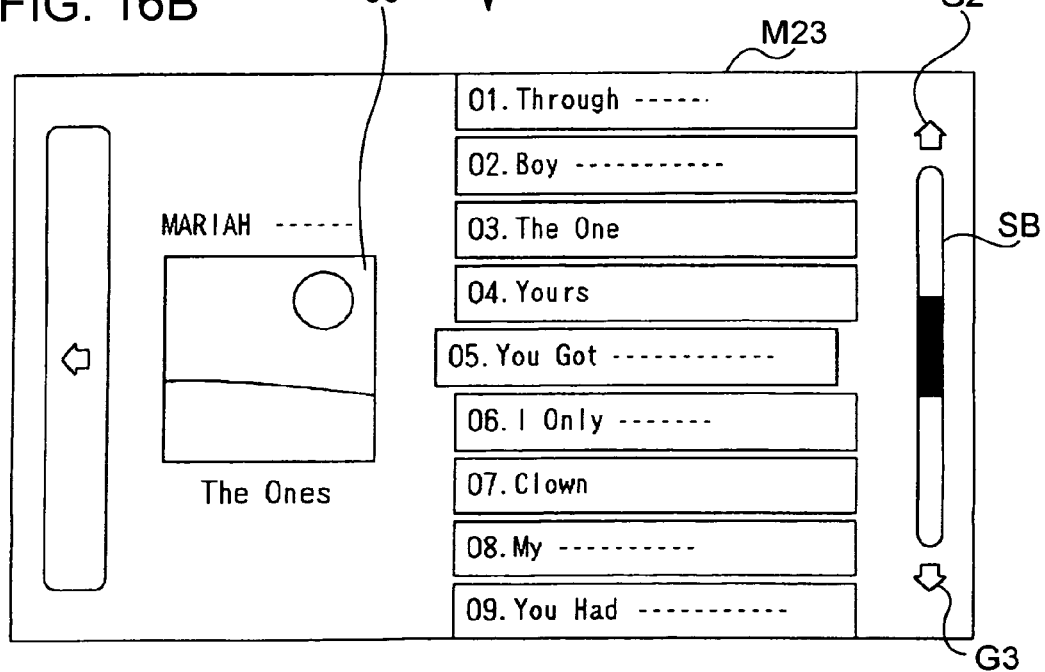

Likewise, in this case, the controller unit 33 switches the menu screen to the intermediate layer menu screen M23 while changing the menus to be displayed in the intermediate layer menu screen M23 via animation. More specifically, as indicated by Arrow D4 in FIG. 13, the controller unit 33 gradually shortens the width of menus 52 displayed in the track layer menu screen M3 to display the menus 52 on the right. In addition, the enlarged image 55 or the like is configured to fade into the intermediate layer menu screen M23.

After displaying the intermediate layer menu screen M12 between the artist layer and the album layer, the controller unit 33 causes the focus displayed in the intermediate layer menu screen M12 to move upward and downward or the listed menus to be scrolled upward and downward in response to the user's operation. Accordingly, the focus is moved to the menu that the user desires. The user's operation may be the operation of the joystick 43 upward and downward, the rotation of the jog dial 46, or the operation of the scroll bar SB detected by the touch panel 39. Then, in response to the press operation of the joystick 43 or the jog dial 46, the controller unit 33 instructs the playback of the music contents, recorded on the hard disk drive 35, contained in the album corresponding to the focused menu. Alternatively, when the touch operation of the menu with a finger or the like is detected by the touch panel 39, the controller unit 33 also instructs the playback of the music contents corresponding to the touched menu.

In contrast, in response to the operation of the joystick 43 to the right, the press operation of the forward button 47, or the touch operation on the right end of the menu screen detected by the touch panel 39, the menu screen is switched to the lower layer menu screen corresponding to the focused menu.

Likewise, in this case, the controller unit 33 determines the period of time during which the joystick 43 and the forward button 47 has been operated or the touch panel 39 has been touched. If the period of the press operation or the touch operation is equal to or longer than a predetermined period, the menu screen is switched to the intermediate layer menu screen M23 as indicated by Arrow A3 in FIG. 1. If the period of the press operation or the touch operation is shorter than the predetermined period, the menu screen is switched to the album layer menu screen M2 as indicated by Arrow B3 in FIG. 1.

Likewise, in this case, the controller unit 33 switches the menu screen to the menu screen M2 or M23 while changing the menus displayed in the intermediate layer menu screen M12 via animation. More specifically, when switching the menu screen to the intermediate layer menu screen M23, as indicated by Arrow C3 in FIG. 14, the controller unit 33 gradually enlarges and moves the cover image displayed in the intermediate layer menu screen M12 to the display position of the enlarged image 55. In addition, as indicated by Arrow D5, the controller unit 33 gradually enlarges each menu 52 to be displayed in the lower layer menu screen M3 from the right end of the screen, such that the menus 52 are faded in. The rest of the menu screen is configured to cross-fade into the intermediate layer menu screen M23. In contrast, the menu screen is switched to the album layer menu screen M2 in a manner opposite to that described in FIG. 12.

On the other hand, in response to the user's operation performed while displaying the intermediate layer menu screen M12, the controller 33 switches the menu screen to the artist layer menu screen M1. The user's operation may be the operation of the joystick 43 to the left, the press operation of the backward button 48, or the touch operation of the display switch guide G1, displayed on the left of the screen, detected by the touch panel 39. In this case, the controller unit 33 switches the menu screen to the artist layer menu screen M1 via animation in a manner opposite to that described in FIG. 10.

Furthermore, after displaying the intermediate layer menu screen M23, the controller unit 33 causes the focus displayed in the intermediate layer menu screen M23 to move upward and downward or the listed menus to be scrolled upward and downward in response to the user's operation, such that the focus is moved to the menu that the user desires. The user's operation may be the operation of the joystick 43 upward and downward, the rotation of the jog dial 46, or the operation of the scroll bar SB detected by the touch panel 39. Then, in response to the press operation of the joystick 43 or the jog dial 46, the controller unit 33 instructs the playback of the music content corresponding to the focused menu. Alternatively, when the touch operation of the menu with a finger or the like is detected by the touch panel 39, the controller unit 33 also instructs the playback of the music content corresponding to the touched menu.

In contrast, in response to the user's operation, the menu screen is switched to the track layer menu screen M3 corresponding to the focused menu as indicated by Arrow B4 in FIG. 1. The user's operation may be the operation of the joystick 43 to the right, the press operation of the forward button 47, or the touch operation on the right end of the menu screen detected by the touch panel 39. In this case, the menu screen is switched via animation in a manner opposite to that described in FIG. 13.

On the other hand, in response to the operation of the joystick 43 to the left, the press operation of the backward button 48, or the operation of the display switch guide G1, disposed on the left side of the menu screen, detected by the touch panel 39, the controller unit 33 switches the menu screen to the upper layer menu screen. At this time, the controller unit 33 determines the period of the press operation performed on the joystick 43 and the backward button 48, or the touch operation of the touch panel 39. If the period of the press operation or the touch operation is equal to or longer than a predetermined period, the menu screen is switched to the intermediate layer menu screen M12 as indicated by Arrow A3. If the period of the press operation or the touch operation is shorter than the predetermined period, the menu screen is switched to the album layer menu screen M2 as indicated by Arrow B2. In this case, the menu screen is switched via animation in manners opposite to those described in FIGS. 14 and 11.

(2) Operation in Embodiment

With the above-described configuration, a user takes the in-vehicle apparatus 1 (FIGS. 2 and 3) home, and connects the in-vehicle apparatus 1 to the computer 3 by mounting the in-vehicle apparatus 1 on the home cradle 2B. The user uploads the files, such as the music content files and the video content files, to the in-vehicle apparatus 1 from the computer 3, and records the files on the hard disk drive 35. Then, the user can enjoy the uploaded music contents and video contents by mounting the in-vehicle apparatus 1 on an in-vehicle cradle 2A disposed in the vehicle.

As soon as the music contents are uploaded, the in-vehicle apparatus 1 accesses a predetermined web page via a communication unit 34 to obtain various data regarding the music contents. The in-vehicle apparatus 1 analyzes the obtained data, and builds a database used for creating the menu screens in the hard disk drive 35. Based on the database in the hard disk drive 35, the in-vehicle apparatus 1 displays the hierarchical menu screens for selection of contents (FIG. 1), when providing the music contents in the vehicle or at home by mounting the in-vehicle apparatus 1 on the home cradle 2B.

More specifically, the in-vehicle apparatus 1 gradually classifies the music contents, recorded on the hard disk drive 35 and providable to the user, into small groups in terms of the classification parameters, such as "artists" and "albums". The in-vehicle apparatus 1 first displays the artist layer menu screen M1 (FIG. 5) having the menus 50 representing "artists", i.e., the major classification parameter. A selection of the menu 50 displayed in the artist layer menu screen M1 causes the album layer menu screen M2 (FIG. 6) to be displayed. The music contents of the selected artist are further classified in terms of the classification parameter "albums". The album layer menu screen M2 has menus 51 each indicating the album. A selection of the menu 51 in the album layer menu screen M2 causes a track layer menu screen M3 (FIG. 7) having the menus 52 to be displayed. Each menu 52 indicates the title of the song of the corresponding music content.

These menu screens (FIG. 1) allows the user to select the menu 51 corresponding to the desired album in the album layer menu screen M2 after selecting the menu 50 in the artist layer menu screen M1. Accordingly, the user can enjoy the music contents of the desired album. In addition, the menu screens allows the user to select the menu 52 corresponding to the desired music content in the track layer menu screen M3 after selecting the menu 51 in the album layer menu screen M2. Accordingly, the user can enjoy the desired music content.

In this embodiment, the artist layer menu screen M1, i.e., the top menu screen, displays menus 50 each composed of the picture and name of the artist. The album layer menu screen M2 displays the menus 51 each having the cover image and title of the album, etc. The track layer menu screen M3, i.e., the lowest menu screen, displays the menus 52 each having the title of the song and the track number. Accordingly, information on the particular music content that the menus provide to the user becomes more detailed as the menu screen shifts to the lower layer. This allows the user to select the desired music content easily and certainly based on the information on the music content displayed in the menus, thereby improving the usability.

Additionally, in this embodiment, the intermediate layer menu screens M12 and M23 are provided between the hierarchical menu screens M1 and M2 and between the hierarchical menu screens M2 and M3, respectively. The intermediate layer menu screens M12 and M23 split the screen into two areas. The intermediate layer menu screens M12 and M23 display the menu selected in the upper layer menu screens M1 and M2 in one area and a plurality of menus displayed in the lower layer menu screens M2 and M3 in another area, respectively. The menu screens M1 to M3 can be switched, displaying the intermediate layer menu screens M12 and M23 therebetween.

As described above, the intermediate layer menu screens M12 and M23 display both the menu selected in the upper layer menu screens M1 and M2 and the plurality of menus displayed in the lower menu screens M2 and M3, respectively. This allows the user to easily recognize the relationship of the menus displayed in each layer even if the menu screen has been shifted to the lower layer.

More specifically, when the hierarchical menu screens M1 to M3 are switched without displaying the intermediate layer menu screens M12 and M23, it becomes difficult for the user to recognize the relationship between the upper layer and lower layer after the menu screen has been shifted to the lower layer. The user may desire to switch the menu screen back to the upper layer. For example, after searching the music content in the lower layer menu screen, the user may be incapable of switching the menu screen back to the upper layer menu screen to select other music contents due to the unclear relationship between the upper layer and the lower layer.

However, in this embodiment, the intermediate menu screens M12 and M23 are provided. More specifically, when the menu screen has been shifted to the lower layer, these intermediate layer menu screens M12 and M23 are displayed before returning to the upper layer menu screen M1. This helps the recognition of the relationship between the upper layer menu screens M1 and M2 and the lower layer menu screens M2 and M3, respectively. Accordingly, the user can easily recognize the relationship between the upper layer and the lower layer even if the menu screen has been shifted to the lower layer, thereby improving the usability.

Furthermore, in this embodiment, the hierarchical menu screens M1 to M3 can be switched to and from the intermediate layer menu screens M12 and M23 via animation. More specifically, the image displayed in the intermediate layer menu screens M12 and M23 is gradually enlarged or reduced. The menus displayed in the intermediate layer menu screens M12 and M23 are configured to cross-fade, fade in, or fade out. Thus, the user can recognize the relationship between the intermediate layer menu screens M12 and M23 and the corresponding menu screens M1 to M3 with this continuous movement. In addition, the user can recognize the relationship of the menus displayed in the hierarchical menu screens M1 to M3 more easily, thereby improving the usability.

Moreover, in this embodiment, modes of switching the menu screens M1 to M3 with or without displaying the intermediate layer menu screens M12 and M23 are selectable according to the user's operation. This also improves the usability.

More specifically, the users who are used to the selection operation of the music content in the in-vehicle apparatus 1 may feel it troublesome when the menu screens M1 to M3 are switched through the intermediate layer menu screens M12 and M23. However, displaying the intermediate layer menu screens M12 and M23 may be convenient for the inexperienced users.

Thus, if a period of press operation or touch operation is long, the in-vehicle apparatus 1 switches the menu screens M1 to M3 without displaying the intermediate layer menu screens M12 and M23. The period of the press operation indicates a period during which the operation buttons for switching the menu screens M1 to M3 have been pressed. The period of the touch operation indicates a period during which the touch panel 39 for switching the menu screens M1 to M3 has been touched.

In contrast, if the period of press operation or touch operation is short, the in-vehicle apparatus 1 switches the menu screens M1 to M3, displaying the intermediate layer menu screens M12 and M23. Likewise, the period of the press operation indicates the period during which the operation buttons for switching the menu screens M1 to M3 have been pressed. The period of the touch operation indicates the period during which the touch panel 39 for switching the menu screens M1 to M3 has been touched.

Accordingly, in this embodiment, the user only changes the operation period of the operation buttons or the touch panel 39 depending on their need. With this easy operation, the display or non-display mode of the intermediate layer menu screen M12 and M23 can be selectable, thereby improving the usability.

In addition, if the long press operation is performed on the operation button for the screen switching or the long touch operation is performed on the touch panel 39 for the display switching while the intermediate menu screen M12 or M23 is displayed, the menu screen is switched to the intermediate menu screens M23 and M12, respectively, without displaying the hierarchical menu screen M2. In contrast, if the short press operation is performed on the operation buttons or the short touch operation is performed on the touch panel 39, the menu screen is switched to the hierarchical menu screen M2.

Accordingly, the in-vehicle apparatus 1 has uniformity in the menu screen switching operations, thereby improving the usability.

Additionally, the in-vehicle apparatus 1 is configured to accept the playback instruction of the music content in the track layer menu screen M3, i.e., the lowest layer menu screen. The playback instruction of the music content is also acceptable in the intermediate layer menu screen M23 that displays the plurality of menus displayed in the track layer menu screen M3. The in-vehicle apparatus 1 is also configured to accept the playback instruction of the album in the album layer menu screen M2. The playback instruction of the album is also acceptable in the intermediate layer menu screen M12 that displays the plurality of menus displayed in the album layer menu screen M2.

Thus, using the in-vehicle apparatus 1, the user can play back the desired album or the desired music content without switching the intermediate layer menu screens M12 and M23 to the lower menu screens M2 and M3, respectively. This also improves the usability.

(3) Advantages of Embodiment

According to the above-described configuration, the intermediate layer menu screen, which displays the menu selected in the upper layer menu screen and the plurality of menus displayed in the lower layer menu screen, is provided. Additionally, the menu screens for selection of contents are displayed in the hierarchical structure. Thus, the user can easily recognize the relationship between the upper layer and the lower layer even if the menu screen has been shifted to the lower layer.

In addition, the switching of the menu screen to and from the intermediate layer menu screen is performed while changing the menus displayed in the intermediate layer menu screen via animation. Thus, the user can recognize the relationship between these menu screens more easily, which can further improve the usability.

Furthermore, the intermediate layer menu screen is omitable in response to the user's operation, which can further improve the usability.

The selection of the content is acceptable in the intermediate layer menu screen as well, which can further improve the usability.

Embodiment 2

FIGS. 15A, 15B, 16A, and 16B are plan views showing intermediate layer menu screens applied to an in-vehicle apparatus according to a second embodiment of the present invention. The in-vehicle apparatus according to this embodiment has the same configuration as an in-vehicle apparatus 1 described in the first embodiment except for the configuration of the intermediate layer menu screens M12 and M23.

In the intermediate layer menu screens M12 and M23 according to this embodiment, display positions of a scroll bar SB and display switch guides G2 and G3 are changeable in response to a user's operation of a remote commander or a touch panel. More specifically, the display positions of the scroll bar SB and the display switch guides G2 and G3, originally located at the position shown in FIGS. 8 and 9, are changed to the left side of the screen, i.e., the outer side of a menu derived from the upper layer menu screen. In accordance with the change of the display positions, a focus set on one of the menus displayed on the right is removed. At the same time, the menu derived from the upper layer menu screen is displayed with a frame K therearound. Accordingly, the menus derived from the upper layer menu screens M1 and M2 are configured to be scrollable, which is notified to the user.

More specifically, in response to the user's operation, the controller unit 33 according to this embodiment sequentially switches the menus derived from the upper layer menu screen surrounded by the frame K to another in an order that the menus 50 and 51 are arranged in the upper layer menu screens M1 and M2, respectively. The user's operation may be an upward and downward operation of a joystick, a rotation operation of a jog dial, or operation of the scroll bar SB detected by the touch panel.

Thus, in this embodiment, the menus derived from the upper layer menu screen are configured to be selectable in the intermediate layer menu screen as well, which can improve the usability.

The menus derived from the lower layer menu screen displayed on the right may be configured to change in accordance with the scroll of the menu, surrounded by the frame K, derived from the upper layer menu screen. Alternatively, the menus derived from the lower layer menu screen may be configured to change in accordance with the change of the display position of the scroll bar SB and display switch guides G2 and G3 back to the right.

According to this embodiment, the menus derived from the upper layer menu screen are selectable in the intermediate layer menu screen as well, which can improve the usability.

Embodiment 3

Figure 17A:
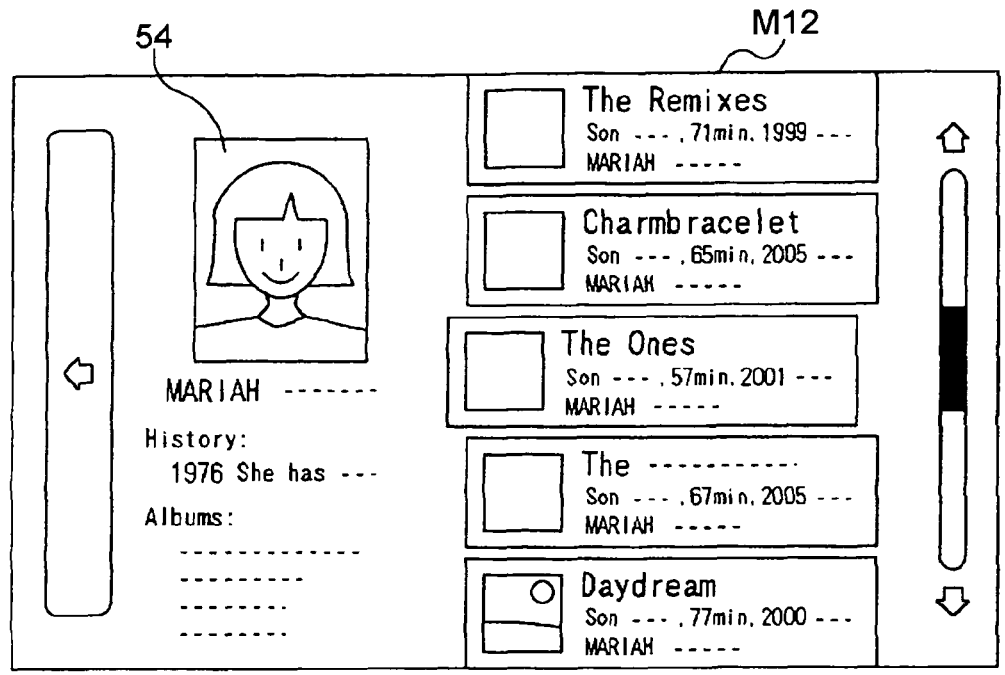
FIGS. 17A and 17B are plan views showing display modes of an intermediate layer menu screen used in an in-vehicle apparatus according to a third embodiment.
Figure 17B:
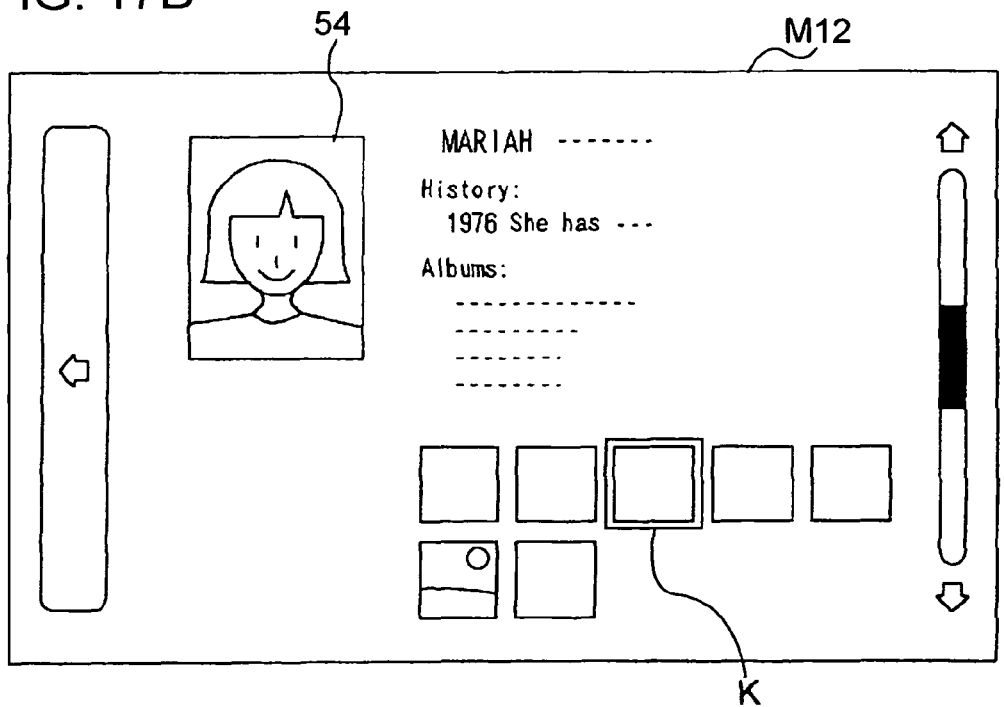

FIGS. 17A and 17B are plan views showing switchable display modes of an intermediate layer menu screen applied to an in-vehicle apparatus according to a third embodiment. The in-vehicle apparatus according to this embodiment has the same configuration as an in-vehicle apparatus 1 described in a first embodiment except for the display modes of the intermediate layer menu screen M12.

In this embodiment, in response to a user's operation of operation buttons performed while the intermediate layer menu screen M12 is displayed, the display mode of the intermediate layer menu screen M12 is switched, as indicated by Arrow. In the switched display mode, only cover images are displayed to represent menus regarding albums. In addition, titles of the albums are correctively displayed. The menus represented by the cover images are arranged in the horizontal direction. A frame K surrounding one of the menus indicates the focused menu.

According to this embodiment, the menus displayed in the intermediate layer menu screen are represented by the cover images. This also provides the same improved usability as the first embodiment.

Embodiment 4

The above-described embodiments have described a case where display or non-display mode of intermediate layer menu screens M12 and M23 is switched in response to a user's operation and menus displayed in the intermediate layer menu screen M12 are switched to those represented by cover images in response to a user's operation. However, the present invention is not limited to these particular configurations. The display or non-display mode of the intermediate layer menu screens M12 and M23 may be preset. The intermediate layer menu screen M12 may be also preset to display the menus represented by the cover images.

In addition, the above-described embodiments have described a case where the menu screens to be switched are determined depending on a period during which operation buttons or a touch panel have been operated. However, the present invention is not limited to this particular configuration. The menu screens to be switched may be determined by a dedicated operation button.

Additionally, the above-described embodiments have described a case where the menu screen is switched to the upper or lower layer menu screen by the user's operations after the intermediate menu screen is displayed. However, the present invention is not limited to this particular switching operation. With one operation performed by the user, the upper or lower layer menu screen may be automatically switched to the lower or upper layer menu screen, respectively, displaying the intermediate menu screen therebetween.

Furthermore, the above-described embodiments have described a case where the music contents are classified in terms of the classification parameters such as "artists" and "albums", and the hierarchical menu screens based on this classification are displayed. However, the present invention is not limited to these particular classification parameters. The present invention is widely applicable to cases, for example, where the music contents are classified in terms of category of music, such as "rock" and "classical music".

Moreover, the above-described embodiments have described a case where the present invention is applied to the provision of music contents. However, the present invention is not limited to this particular application, and may be applied to the provision of video contents. In this case, the video contents are classified in terms of "broadcast stations" and "on-air times" so as to compose hierarchical menu screens. Alternatively, the video contents are classified in terms of "category of video" and "cast" so as to compose the hierarchical menu screens.

Moreover, the above-described embodiments have described a case where the present invention is applied to the in-vehicle apparatus. However, the present invention is not limited to this particular application, and may be widely applicable to playback apparatuses for playing back the music contents and the video contents, and computers having a function for playing back the audio contents and the video contents.

It should be understood by those skilled in the art that various modifications, combinations, sub-combinations and alterations may occur depending on design requirements and other factors insofar as they are within the scope of the appended claims or the equivalents thereof.

What is claimed is:

1. A playback apparatus for playing back and providing contents to a user, the playback apparatus comprising:
   a menu screen display unit to display a menu screen of the contents;
   an input unit to detect an input operation of a selection of content displayed in the menu screen; and
   a control unit to cause the menu screen display unit to switch the menu screen on a basis of the input operation detected by the input unit, and to instruct a playback operation of the selected content,
   wherein the menu screen display unit, under control of the control unit, switches an upper layer menu screen to and from a lower layer menu screen through an intermediate layer menu screen therebetween,
   the upper layer menu screen shows categories of the contents,
   the lower layer menu screen shows some of the contents, which are classified into one of the categories displayed in the upper layer menu screen, a focused content being horizontally shifted relative to other contents shown on the lower layer menu screen,
   the intermediate layer menu screen displays a menu selected in the upper layer menu screen, and displays a plurality of menus displayed in the lower layer menu screen, a focused one of the plurality of menus being horizontally shifted relative to others of the plurality of menus, one or more individual pictures are displayed on the upper layer menu screen and the intermediate layer menu screen, the controller, when switching from the upper layer menu screen to the intermediate layer menu screen, causes the menu screen display unit to display an enlarging of one of the individual pictures displayed in the upper layer menu screen and a moving of the one of the individual pictures to become one of the individual pictures of the intermediate layer menu screen, the moving of the one of the pictures is independent of other objects displayed on the menu screen display unit, and each of said upper layer menu screen, lower layer menu screen, and intermediate layer menu screen displays:
at least a first display switch guide configured for indicating the existence of an upper layer menu screen,
at least a first scroll bar, and
at least a second and third display switch guide configured for indicating that the displayed menus are scrollable.

2. The apparatus according to claim 1, wherein the menu screen display unit switches the intermediate layer menu screen to and from the lower layer menu screen while changing the menus displayed in the intermediate layer menu screen via animation.

3. The apparatus according to claim 1, wherein the plurality of menus displayed in the lower layer menu screen are target menus representing the contents to be selected, and wherein the control unit accepts the selection of the content in both the lower layer menu screen and the intermediate layer menu screen on a basis of an operation detected by the input unit, and instructs the playback operation of the selected content.

4. A menu display method for displaying menu screens, in which a user's selection of content is accepted, the menu display method comprising the steps of:
displaying an upper layer menu screen;
displaying an intermediate layer menu screen, wherein one or more individual pictures are displayed on the upper layer menu screen and the intermediate layer menu screen;
displaying a lower layer menu screen;
switching the upper layer menu screen, the intermediate layer menu screen, and the lower layer menu screen in response to a user's operation; and
when switching from the upper layer menu screen to the intermediate layer menu screen, causing a display unit to display an enlarging of one of the individual pictures displayed in the upper layer menu screen and a moving of the one of the individual pictures to become one of the individual pictures of the intermediate layer menu screen, the moving of the one of the pictures is independent of other objects displayed on the menu screen display unit, wherein
the upper layer menu screen shows categories of the contents,
the lower layer menu screen shows some of the contents, which are classified into one of the categories displayed in the upper layer menu screen, a focused content being horizontally shifted relative to other contents shown on the lower layer menu screen,
the intermediate layer menu screen displays a menu selected in the upper layer menu screen, and displays a plurality of menus displayed in the lower layer menu screen, a focused one of the plurality of menus being horizontally shifted relative to others of the plurality of menus, and
each of said upper layer menu screen, lower layer menu screen, and intermediate layer menu screen displays:
at least a first display switch guide configured for indicating the existence of an upper layer menu screen,
at least a first scroll bar, and
at least a second and third display switch guide configured for indicating that the displayed menus are scrollable.

5. The method according to claim 4, wherein, in the step of switching the menu screen, the intermediate layer menu screen is switched to and from the lower layer menu screen while changing the menus displayed in the intermediate layer menu screen via animation.

6. The method according to claim 4, wherein the plurality of menus displayed in the lower layer menu screen are target menus representing the contents to be selected, and wherein the selection of the content is accepted in both the lower layer menu screen and the intermediate layer menu screen.

7. A recording medium recording a program thereon allowing a processor to execute a menu display process, for displaying menu screens in which a user's selection of content is accepted, the process comprising the steps of:
displaying an upper layer menu screen;
displaying an intermediate layer menu screen, wherein one or more individual pictures are displayed on the upper layer menu screen and the intermediate layer menu screen;
displaying a lower layer menu screen;
switching the upper layer menu screen, the intermediate layer menu screen, and the lower layer menu screen in response to a user's operation; and
when switching from the upper layer menu screen to the intermediate layer menu screen, causing a display unit to display an enlarging of one of the individual pictures displayed in the upper layer menu screen and a moving of the one of the individual pictures to become one of the individual pictures of the intermediate layer menu screen, the moving of the one of the pictures is independent of other objects displayed on the menu screen display unit, wherein
the upper layer menu screen shows categories of the contents,
the lower layer menu screen shows some of the contents, which are classified into one of the categories displayed in the upper layer menu screen, a focused content being horizontally shifted relative to other contents shown on the lower layer menu screen,
the intermediate layer menu screen displays a menu selected in the upper layer menu screen, and displays a plurality of menus displayed in the lower layer menu screen, a focused one of the plurality of menus being horizontally shifted relative to others of the plurality of menus, and
each of said upper layer menu screen, lower layer menu screen, and intermediate layer menu screen displays:
at least a first display switch guide configured for indicating the existence of an upper layer menu screen,
at least a first scroll bar, and
at least a second and third display switch guide configured for indicating that the displayed menus are scrollable.

* * * * *